US009503878B2

(12) United States Patent
Moy et al.

(10) Patent No.: US 9,503,878 B2
(45) Date of Patent: Nov. 22, 2016

(54) METHODS AND SYSTEMS OF PAIRING WIRELESS DEVICES

(71) Applicant: QUALCOMM Incorporated, San Diego, CA (US)

(72) Inventors: Raymond Alexander Moy, San Diego, CA (US); Brian Frederick Miller, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/592,985

(22) Filed: Jan. 9, 2015

(65) Prior Publication Data

US 2016/0128114 A1  May 5, 2016

Related U.S. Application Data

(60) Provisional application No. 62/069,888, filed on Oct. 29, 2014.

(51) Int. Cl.
| | |
|---|---|
| *H04W 4/00* | (2009.01) |
| *H04W 8/00* | (2009.01) |
| *H04W 12/06* | (2009.01) |

(52) U.S. Cl.
CPC ............. *H04W 8/005* (2013.01); *H04W 12/06* (2013.01)

(58) Field of Classification Search
CPC .......................... H04W 76/023; H04W 8/005
USPC ........................................................ 455/434
See application file for complete search history.

(56) References Cited

U.S. PATENT DOCUMENTS

| | | | |
|---|---|---|---|
| 8,437,275 B2 | 5/2013 | Banerjee et al. | |
| 8,509,105 B2 | 8/2013 | Kneckt et al. | |
| 2011/0082939 A1* | 4/2011 | Montemurro | H04L 69/24 709/227 |
| 2011/0142014 A1* | 6/2011 | Banerjee | H04L 63/0869 370/338 |
| 2012/0011247 A1 | 1/2012 | Mallik et al. | |
| 2014/0287684 A1 | 9/2014 | Van Den Bosch et al. | |
| 2015/0099469 A1* | 4/2015 | Goldstein | H04L 67/24 455/41.2 |
| 2015/0296545 A1* | 10/2015 | Glik | H04W 76/02 455/41.3 |

FOREIGN PATENT DOCUMENTS

EP          2634999 A1     9/2013

* cited by examiner

*Primary Examiner* — Tanmay Shah
(74) *Attorney, Agent, or Firm* — The Marbury Law Group, PLLC

(57) ABSTRACT

Embodiments include systems and methods of verifying wireless devices for paring without user interaction or with reduced user interaction. A processor may send, from a first wireless device to a second wireless device, a discovery query, and may receive a discovery response from the second wireless device. The processor may authenticate, in the first wireless device, the second wireless device based on the discovery response. The processor may send, from the first wireless device to a second wireless device, a first capability query. The processor may receive, in the first wireless device from the second wireless device, a first capability response including first capability response information. The processor may authenticate, in the first wireless device, the second wireless device based on the first capability response information. The processor may initiate a pairing process between the first and second wireless devices when the first wireless device authenticates the second wireless device.

18 Claims, 12 Drawing Sheets

METHODS AND SYSTEMS OF PAIRING WIRELESS DEVICES

RELATED APPLICATIONS

This application claims the benefit of priority to U.S. Provisional Application No. 62/069,888 entitled "Methods and Systems of Pairing Wireless Devices Without User Interaction" filed Oct. 29, 2014, the entire contents of which are incorporated herein by reference.

BACKGROUND

Wireless devices that communicate using short range communication are increasingly ubiquitous. However, the complexity of configuring wireless devices to intercommunicate may prove both technically challenging and inconvenient for users. One of the most difficult problems that users face when configuring wireless devices to communicate with each other is the "pairing" process. Users may have trouble putting wireless devices into the correct mode for pairing, and once in the correct mode wireless devices may not readily identify another wireless device for pairing. Further, for security purposes, a user may be required to enter a code, such as a randomly generated number, personal identification number (PIN), or other code, before two wireless devices may pair and begin communication, which may require not only additional steps for the user, but also that the wireless devices include a display and a user interface. As the market for wearable wireless devices and the "Internet of Things" evolve, the complexity of the pairing process may increase as more machine-to-machine connections are desired between wireless devices that are too small for a user interface or for which the user interface design takes a backseat to the wireless device's primary purpose.

SUMMARY

The various aspects include methods of verifying wireless devices for pairing without user interaction or with reduced user interaction, which may include sending, from a first wireless device to a second wireless device, a discovery query, receiving, from the second wireless device in the first wireless device, a discovery response, authenticating, in the first wireless device, the second wireless device based on the discovery response, sending a first capability query from the first wireless device to the second wireless device, receiving, in the first wireless device from the second wireless device, a first capability response including first capability response information, authenticating, in the first wireless device, the second wireless device based on the first capability response information, and initiating a pairing process between the first and second wireless devices when the first wireless device authenticates the second wireless device.

In an aspect, authenticating, in the first wireless device, the second wireless device may be based on a set of one or more comparisons of the first capability response information and information stored on the first wireless device. In an aspect, authenticating, in the first wireless device, the second wireless device may be based on a comparison of the first capability response information and information stored on the first wireless device and may include parsing values from the first capability response, and comparing each parsed value to a respective criterion. In an aspect, authenticating, in the first wireless device, the second wireless device may be based on a comparison of the first capability response information and information stored on the first wireless device and may include parsing a first value and a second value from the first capability response, comparing the first value to a first criterion, modifying a second criterion based on the comparison of the first value to the first criterion, and comparing the second value to the modified second criterion.

In an aspect, the method may further include receiving, from the second wireless device in the first wireless device, a second capability query responsive to the first capability query, and sending, from the first wireless device to the second wireless device, a second capability response including second capability response information responsive to the second capability query. In an aspect, the method may further include sending, from the first wireless device to the second wireless device, a pairing request when the first wireless device authenticates the second wireless device based on the first capability response information, and receiving, from the second wireless device in the first wireless device, an acceptance in response to the pairing request, wherein the acceptance is based on the second capability response information. In an aspect, the first capability response information may include one or more of information about capabilities of and services available from the second wireless device, and the second capability response information comprises one or more of information about capabilities of and services available from the first wireless device.

In an aspect, sending, from a first wireless device to a second wireless device, a first capability query may include sending the first capability query based on the authentication of the second wireless device in the first wireless device based on the discovery response. In an aspect, the discovery response may include one or more of a second wireless device identifier, a second wireless device address, a received signal level indicator related to the discovery query from the first wireless device, and a transmit power level of the second wireless device.

In an aspect, the first wireless device may be configured as a discovering wireless device and the second wireless device may be configured as a discoverable wireless device. In an aspect, at least one of the first wireless device and the second wireless device may include a mobile communication wireless device.

Further aspects include a computing device including a processor configured with processor-executable instructions to perform operations of the aspect methods described above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
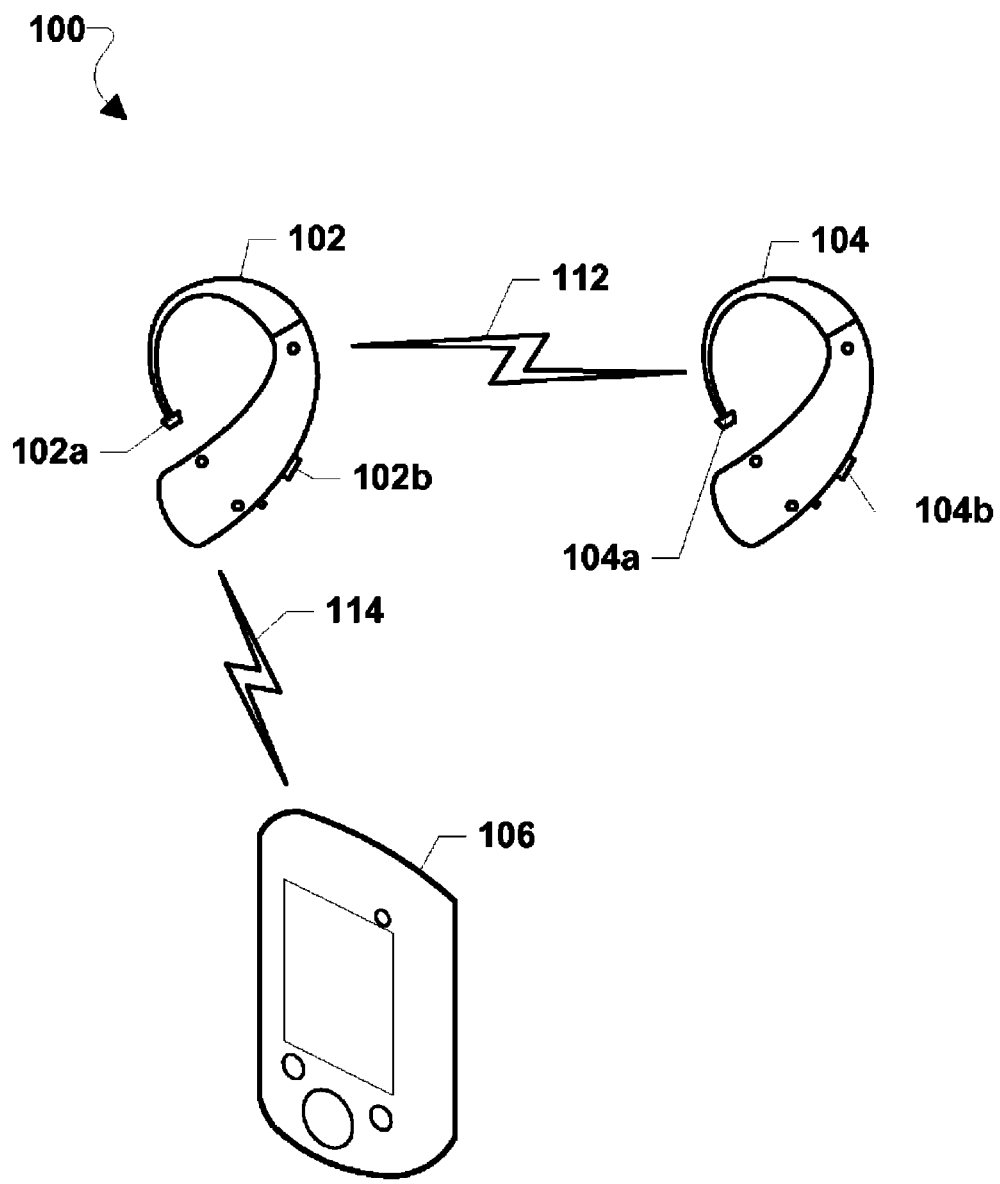
FIG. 1 is a system diagram illustrating components suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide methods, and wireless devices configured to implement the methods, that enable two wireless devices to complete a pairing processes, including verifying the wireless devices being paired, with little or no user interaction. The embodiments may be particularly useful for wireless devices that have minimal or no user interfaces, and thus are not suitable for conventional pairing and wireless device verification processes.

The terms "computer," and "computing wireless device" are used interchangeably herein to refer to any programmable computer, server or processor that can be configured with programmable instruction to perform the embodiment methods.

The terms "wireless device", "wireless communication device", and "mobile device" are used herein to refer generally to any one or all of wireless accessory devices, wireless peripheral devices, cellular telephones, smartphones, web-pads, tablet computers, Internet enabled cellular telephones, WiFi enabled electronic devices, personal data assistants (PDAs), laptop computers, personal computers, and similar electronic devices equipped with a short-range radio (e.g., a Bluetooth® radio, a Peanut® radio, a WiFi radio, etc.) and/or a wide area network connection (e.g., an LTE, 3G or 4G wireless wide area network transceiver or a wired connection to the Internet). Reference to a particular type of computing device as being a mobile device or a wireless device is not intended to limit the scope of the claims unless a particular type of mobile device or wireless device is recited in the claims.

As used in this application, the terms "component," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device itself may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

"Pairing" refers to a process in which two wireless devices that are capable of short-range wireless communication are configured to establish a communication session with each other. Certain communication protocols, such as Bluetooth, may include a security process such as the generation of an encryption key or link key that is used by each of the paired wireless devices for their wireless communication. The pairing process typically is a multistep process that requires user interaction. For example, a user may be required to provide an input to each of the wireless devices to place them in a discoverable mode, a further input to at least one wireless device to select the other wireless device for pairing, and the user may further be required to enter a code or verification number to each wireless device or provide some other verification input to each wireless device (such as additional button presses). Requiring user verification in the pairing process may be used to prevent a third wireless device from surreptitiously pairing with one of the wireless devices (e.g., to avoid a man-in-the middle attack). While wireless devices may be paired at a place of manufacture before sale to a user, doing so may make the replacement of a defective wireless device more cumbersome.

As the market for wearable wireless devices and the "Internet of Things" evolve, the complexity of the pairing process may increase as more machine-to-machine connections are desired between wireless devices that are too small for a user interface or for which the user interface design takes a backseat to the wireless device's primary purpose. As one example, the Qualcomm® Toq™ Earpiece project is part of an emerging market of pairs of Bluetooth earpieces and speakers that can play stereo music that originates from a single source. Such products may include a left wireless device and a right wireless device that may communicate via a short range communication protocol, such as Bluetooth, in order to produce stereo music that is streamed from a third wireless device, such as a phone or other media source. Playing stereo music typically uses two active wireless connections to transfer the music data—a first connection between the media source and one of the earpieces, and a second connection between the earpieces—both of which require configuration using a pairing process.

The pairing process between the phone and one of the earpieces may be performed using a visual menu on the media source. However, pairing the two earpieces, which may have a very limited user interface (for example, one or two physical buttons and one or two LEDs) presents greater challenges. Both an increase of variety of wearable wireless devices and growth of the number and type of wireless devices connected to the Internet of Things may exacerbate the inherent frustrations of configuring wireless devices for short-range intercommunication. Requiring users to be involved in the pairing process for each wireless device may not only degrade the user experience by being tedious, but it may also introduce additional opportunities for user error (e.g., incorrect input of password). Thus, reducing the complexity of the authentication or pairing process is quickly becoming an important design criterion.

The various embodiments may include methods, and wireless devices configured to implement the methods, of verifying wireless devices for pairing without user interaction or with reduced user interaction relative to conventional pairing solutions. Prior to initiating a pairing process, two wireless devices may perform a multi-step authentication, in which one wireless device may authenticate, or reject, the other wireless device at any one of several steps in the process. In some embodiments, prior to initiating a pairing process, two wireless devices may use a device discovery process and/or a capability discovery process to collect a set of information that in the aggregate may indicate with a high degree of confidence that the other wireless device is both located relatively closely, and that the wireless device has provided information in response to queries that match expected responses (e.g., criteria stored on a wireless device, such as a priori information, ranges, thresholds, and the like). Using a pre-pairing information exchange to verify the identity of the other wireless device for pairing may provide a greater level of confidence and security than requiring user involvement, for example, to pair wireless devices by providing an input to a display on each wireless device. Such a verification process is also faster and vastly more convenient for a user.

FIG. 1 illustrates a system 100 suitable for use in various embodiments including a first wireless device 102, a second wireless device 104, and a source wireless device 106. Each of the first and second wireless devices may be configured to wirelessly exchange information to authenticate the other wireless device prior to initiating a pairing process, and to communicate via a short-range communication link 110 after completing the pairing process. The first wireless device and the source wireless device may also communicate wirelessly 114 after a pairing process is complete between them.

Each of the first wireless device, the second wireless device, and the source wireless device may include a memory or similar non-transitory computer-readable or processor-readable media, and a processor for executing code and/or instructions that may be stored in the memory. Each of the first and second wireless devices may also include an audio output 102a, 104a, such as a speaker, for generating sound in response to audio signals, and an input device 102b, 104b, such as a button, slider, knob, or similar physical input device. The first and second wireless devices may be relatively small such that they may be worn on a user's body (e.g., as earpieces) or attached to the outside of a user's clothing. Due to their relatively small size, the first and second wireless devices may not be large enough to include a display device and/or a more complex input device, such as a larger number of buttons or a keyboard.

The source wireless device 106 may include a function, such as a media player, that transmits audio and/or other media to the first wireless device via communication 114. The first wireless device may transmit the audio/other media to the second wireless device via communication 112. In an embodiment, the first and second wireless devices and the source wireless device may communicate using an advanced audio distribution profile (A2DP) configuration.

In an embodiment, wireless devices 102 and 104 may include a left earpiece and a right earpiece, respectively, though this is not intended as a limitation, and the first and second wireless devices may include any wireless devices that may be configured to verify another wireless device for pairing without user interaction or with reduced user interaction.

Figure 2:
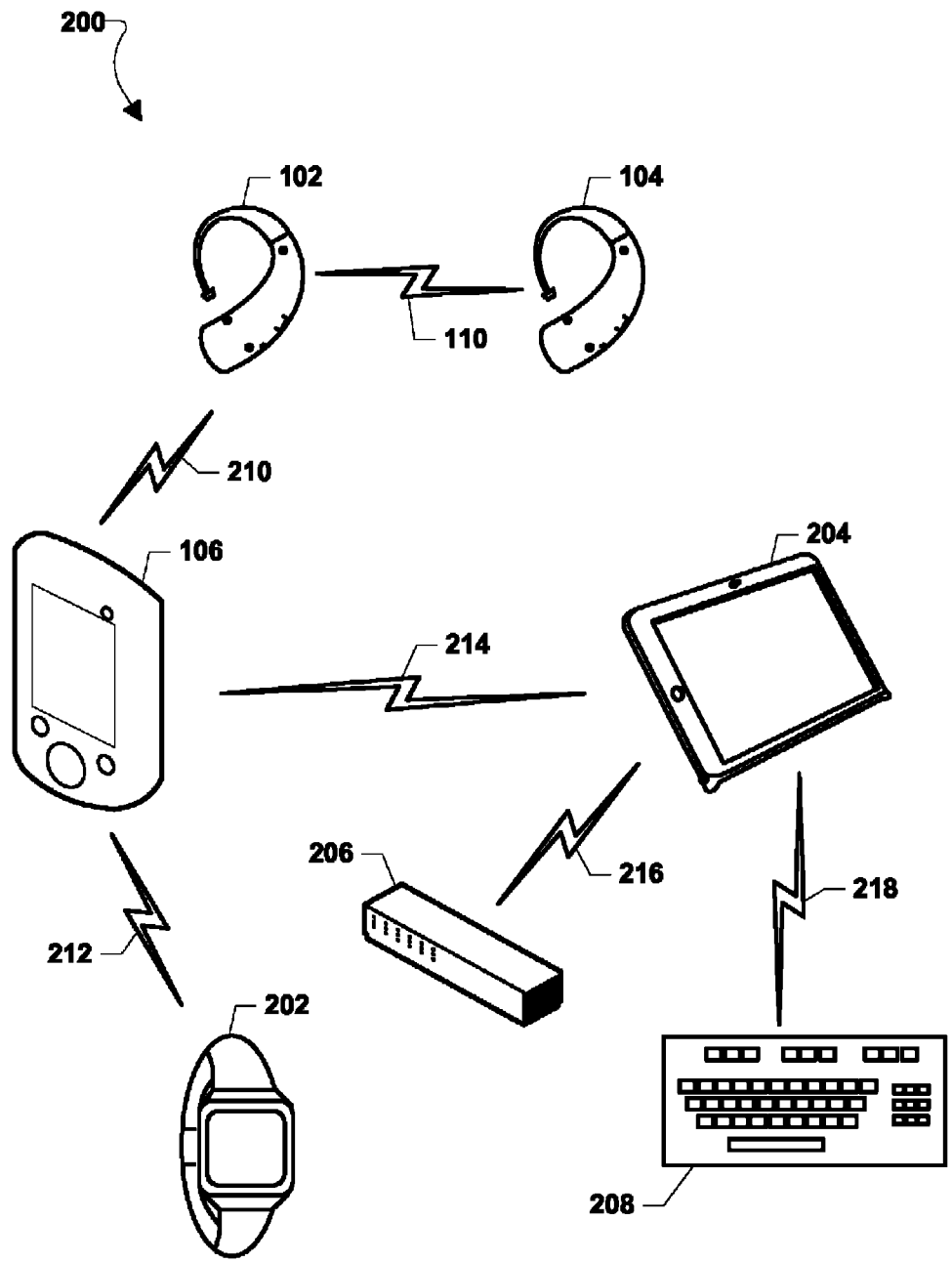
FIG. 2 is a system diagram illustrating components suitable for use in various embodiments.

FIG. 2 illustrates a system 200 suitable for use in various embodiments including a variety of wireless devices which may verify another wireless device for pairing without user interaction or with reduced user interaction. In addition to the first wireless device 102 and the second wireless device 104, which may be configured to wirelessly exchange information 110 to verify the other wireless device, the source wireless device 106 and the first wireless device 102 may each wirelessly exchange information 210 to verify the other wireless device. The source wireless device 106 and a smart display 202 may each wirelessly exchange information 212 to verify the other wireless device for pairing. As additional examples, the source wireless device 106 and a tablet wireless device 204, the tablet wireless device 204 and a media hub 206, and the tablet wireless device 204 and a keyboard or other accessory wireless device 208, may each wirelessly exchange information (via communication 214, 216, and 218, respectively) to verify the other wireless device for pairing. The inclusion of a variety of wireless devices in FIG. 2 is not intended to require that any or all of such wireless devices are employed at the same time, but rather to illustrate the diversity of wireless devices which may exchange information for verification before pairing. Other wireless devices may also be suitable for use in some embodiments.

Figure 3:
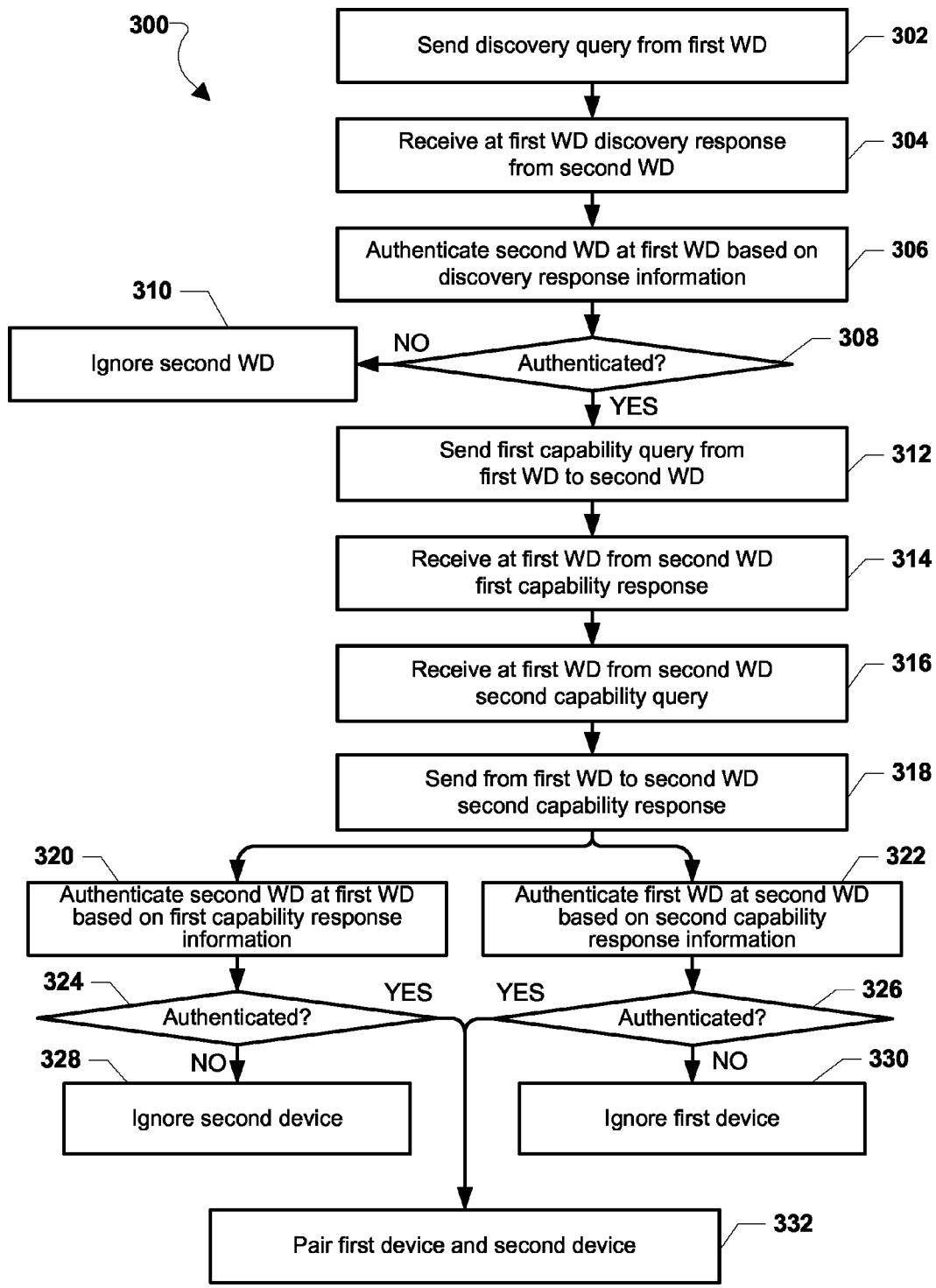
FIG. 3 is a process flow diagram illustrating an embodiment method for pairing wireless devices without user interaction or with reduced user interaction.

FIG. 3 illustrates a process flow diagram of an embodiment method 300 that may be implemented by a processor on a wireless device (e.g., the processor of the first wireless device 102 or of the second wireless device 104 of FIG. 1, and/or the like) for verifying another wireless device for pairing according to some embodiments. In block 302, the first wireless device may send a discovery query to the second wireless device. In some embodiments, the discovery query may include instructions or a request that the second wireless device provide information about its identity and/or certain of its capabilities. For example, the information may include an address of the second wireless device (e.g., a MAC address or a Bluetooth device address), an identifier of the second wireless device (e.g., a name or other identifier), a transmit power level of the second wireless device, an enumerator or description of capabilities of the second wireless device (e.g., a universally unique identifier (UUID)), and/or other similar information. In some embodiments, the discovery query may include a message broadcast by the first wireless device to determine whether any discoverable wireless devices are within reception range of the first wireless device.

In block 304, the first wireless device may receive the discovery response from the second wireless device. The first wireless device may determine a received signal level (e.g., a received signal strength indicator (RSSI) or another signal level indicator) based on the signal in which the first wireless device receives the discovery response. The discovery response may include information such as an address and/or an identifier of the second wireless device, a transmit power level of the second wireless device, an enumerator or description of capabilities of the second wireless device, a received signal level indicator related to the discovery query, and/or other similar information. In some embodiments, the discovery response may include a Frequency Hopping Synchronization (FHS) packet, as may be used in the Bluetooth protocol, which may include a device address (e.g., a Bluetooth device address) and/or clock data of the second wireless device. In some embodiments, the discovery response may include an Extended Inquiry Response (EIR), as may be used in the Bluetooth protocol, which may include one or more of service UUIDs, a name, configuration flags, available Bluetooth profiles, custom manufacturer's data, and a transmit power level of the second wireless device. In block 306, the first wireless device may authenticate the second wireless device based on the determined signal level and/or the discovery response information received by the first wireless device from the second wireless device. The first wireless device may use the authentication to determine whether to pair with the second wireless device. In some embodiments, the first wireless device may authenticate the second wireless device based on the received signal level. For example, the first wireless device may be configured to authenticate the second wireless device only when the second wireless device is located within predetermined distance from the first wireless device. The first wireless device may use the received signal level to determine whether the second wireless device is within the predetermined distance, e.g., when the receive signal power level satisfies a threshold signal power level. In some embodiments, the first wireless device may also use a transmit power indication received from the second wireless device together with the received signal power level to determine whether the second wireless device is within the predetermined distance from the first wireless device.

In some embodiments, the first wireless device may also use the discovery response information to authenticate the second wireless device. For example, when the first wireless device determines that the received signal level of the second wireless device satisfies the signal level threshold, the first wireless device may compare one or more elements of the discovery response information with one or more criteria stored on the first wireless device. For example, when the address of the second wireless device, or the identifier of the second wireless device, and/or the enumerator or description of capabilities of the second wireless device substantially matches an expected value or values stored on the first wireless device, the first wireless device may proceed to discover capabilities of the second wireless device.

In response to determining that the second wireless device is not within the predetermined distance from the first wireless device and/or that one or more elements of the discovery response information do not substantially match one or more criteria stored on the first wireless device (i.e., determination block 308="NO"), the first wireless device may ignore the second wireless device in block 310. Ignoring the second wireless device may include a decision not to pair with the second wireless device, and may include not responding to further messages from the other wireless device. In some embodiments, ignoring the other wireless device may include setting a flag or other data indication in a memory of the wireless device to actively prevent pairing with the other wireless device. For example, ignoring the second wireless device may include placing an identifier of the second wireless device on a blacklist stored on the first wireless device, or associating the second wireless device with another indication that the first wireless device should not pair with the second wireless device. The blacklist, association, flag, or other data indication may be stored in a memory of the first wireless device.

In response to determining that the second wireless device is within the predetermined distance from the first wireless device and/or that one or more elements of the discovery response information substantially match one or more criteria stored on the first wireless device (i.e., determination block 308="YES"), the first wireless device may proceed to discover capabilities of the second wireless device in blocks 312-332 as described below.

In block 312, the first wireless device may send to the second wireless device a first capability query. In block 314, the first wireless device may receive a first capability response from the second wireless device. The capability response may include information about capabilities of, and services available from, the second wireless device. For example, the capability response information may include a list of service attribute IDs that may be paired up with each service attribute's value. The attributes may vary depending on what services are represented. For example, a Device ID service record may include attributes such as SpecificationID, VendorID, ProductID, Version, PrimaryRecord, VendorIDSource, ClientExecutableURL, ServiceDescription, and DocumentationURL. As another example, Bluetooth services that may be used during a connection, such as a hands-free profile, may include attributes such as whether the service is available, as well as configuration options describing what hands-free features are supported by the second wireless device. In some embodiments, the capability query and response stage may form a "capability gathering session." In some embodiments, the capability query may inquire for a known custom service to determine if it exists. In some embodiments, the capability query may inquire for a special device identification service record to learn about a device's properties. In some embodiments, the first wireless device may send two or more capability queries, e.g., to determine whether the second wireless device supports both a hands-free profile as well as an advanced audio profile. In this scenario, the first wireless device may send a first query related to the hands-free profile, may receive a response from the second wireless device, and then may send a second query related to the advanced audio profile and may receive another response from the second wireless device.

Figure 5:
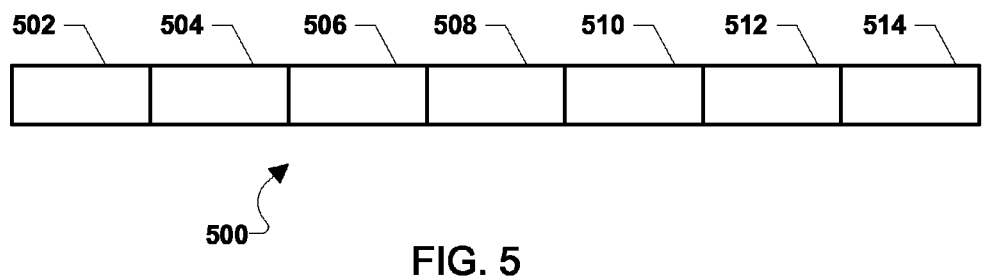
FIG. 5 is a block diagram illustrating capability response information suitable for use in various embodiments.

As an example, FIG. 5 illustrates a capability response 500 that includes a first information 502, a second information 504, a third information 506, a fourth information 508, a fifth information 510, a sixth information 512, and a seventh information 514 that may be parsed from the capability response. The capability response 500 may include more or less information. As one example, the capability response 500 may include a SpecificationID (which may correspond with the first information 502), a VendorID (which may correspond with the second information 504), a ProductID (which may correspond with the third information 506), Bluetooth profiles available in the second wireless device (which may correspond with the fourth information 508), a Version (which may correspond with fifth information 510), a PrimaryRecord (which may correspond with sixth information 512), and a VendorIDSource (which may correspond with seventh information 514). Other information, such as a ClientExecutableURL, a ServiceDescription, and a DocumentationURL, may also be included in the capability response, as well as different information in various embodiments. Further, one or more of the preceding examples may be omitted from the capability response.

In some embodiments, the capability query may include a Service Discovery Protocol (SDP) request, and the capability response may include an SDP response, such as may be used in the Bluetooth protocol. An SDP requester (e.g., the first wireless device) may either search for services by searching for specific attribute values or may browse for services. When the requester receives an SDP record of a service, that record may list service attribute IDs paired up with each service attribute's value.

Returning to FIG. 3, in block 316, the second wireless device may send a second capability query to the first wireless device. In some embodiments, the second wireless device may send the second capability query in response to receiving the first capability query from the first wireless device. In block 318, the first wireless device may send a second capability response to the second wireless device. Similar to the first capability response, the second capability response may include information about capabilities of, and services available from, the first wireless device.

In block 320, the first wireless device may authenticate the second wireless device based on the first capability response information, and in block 322, the second wireless device may authenticate the first wireless device based on the second capability response information. In some embodiments, each of the first and second wireless devices may compare the received capability response information with a value or values stored on the wireless device. In some embodiments, each wireless device may compare a value based on the entire capability response to a value stored on the first wireless device. For example, the first or second wireless device may use a numerical value of the entire received discovery response information, or the wireless device may calculate a value (e.g., a vector, a hash value, or another derived value) using the entire discovery response information. When the numerical value or the derived value of the discovery response information matches the stored value, the wireless device may authenticate the other wireless device. The authentications performed by the first and second wireless device may be performed substantially simultaneously. In some embodiments, the authentications may be performed by each wireless device serially, i.e., by one wireless device first followed by the other wireless device.

In some embodiments, each first wireless device may perform a set of comparisons in which the wireless device may parse information from the received discovery response information and compare each of the parsed information to respective criteria. The criteria may depend on the type of parsed information to which it may be compared. In some embodiments, all of the parsed values must match or satisfy respective criteria in order for a wireless device to authenticate the other first wireless device. In some embodiments, the wireless device may authenticate the other wireless device when fewer than all of the parsed values satisfy their respective criteria. In some embodiments, when a second parsed value fails to satisfy its criteria, the second wireless device may modify a second criterion and compare a second parsed value to the modified second criterion.

In determination block 324, a processor on the first wireless device may determine whether the second wireless device is authenticated, and in determination block 326, a processor on the second wireless device may determine whether the first wireless device is authenticated. Each of the first and second wireless devices may use the authentication to determine whether to pair with the other wireless device.

In response to the first wireless device determining that the second wireless device is not authenticated (i.e., determination block 324="NO"), the first wireless device may ignore the second wireless device in block 328. In response to the second wireless device determining that the first wireless device is not authenticated (i.e., determination block 326="NO"), the second wireless device may ignore the first wireless device in block 330. Ignoring the other wireless device may include a decision not to pair with the other wireless device, and may include not responding to further messages from the other wireless device. In some embodiments, ignoring the other wireless device may include setting a flag or other data indication in a memory of the wireless device to actively prevent pairing with the other wireless device. For example, ignoring the other wireless device may include placing an identifier of the other wireless device on a blacklist, or associating the other wireless device with another indication that the wireless device should not pair with the other wireless device. The blacklist, association, flag, or other data indication may be stored in a memory of the wireless device.

In response to each of the first and second wireless devices determining that the other wireless device is authenticated (i.e., determination blocks 324 and 326="YES"), the first and second wireless devices may proceed with a pairing process in block 332. In some embodiments, the wireless devices may use a pairing process that does not require user interaction, such as an input of a code, PIN, or other verification information, for example, Bluetooth Just Works Secure Simple Pairing (SSP). While a pairing process that does not require user interaction may not be as secure as requiring user input to verify the selection of wireless devices for pairing, as may be required using a numeric comparison, passkey entry, or another similar process, the multi-step verification performed by the first and second wireless devices may provide a high level of confidence and security of the identity of each of the first and second wireless devices without user interaction or with reduced user interaction.

Figure 4:
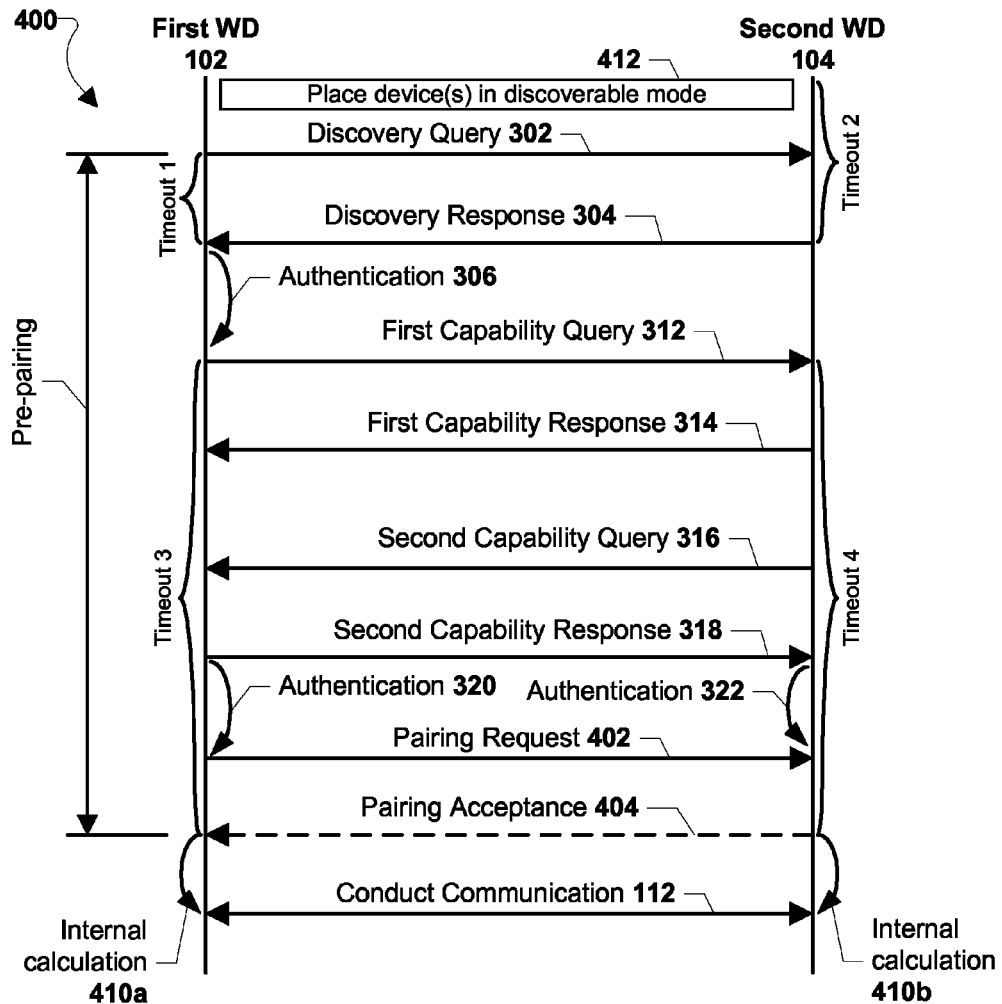
FIG. 4 is a call flow diagram illustrating another embodiment method for pairing wireless devices without user interaction or with reduced user interaction.

FIG. 4 illustrates a call flow diagram of an embodiment method 400 that may be implemented by a processor on a wireless device (e.g., the processor of the first wireless device 102 or the second wireless device 104 of FIG. 1, and/or the like) for verifying another wireless device for pairing according to some embodiments. In some embodiments, the discovery and capability determination processes described below may be performed using the communication link 110 illustrated in FIG. 1 that may be used by each of the first wireless device and the second wireless device to verify the other wireless device for pairing.

The first wireless device 102 may send to the second wireless device 104 a discovery query 302. The discovery query may include a message that may be broadcast by the first wireless device to determine whether any discoverable wireless devices are within reception range of the first wireless device. In some embodiments, the discovery query may also request that receiving wireless devices identify themselves and/or provide information about their capabilities. In some embodiments, the discovery query may include a Bluetooth inquiry message.

In some embodiments, the first wireless device and/or the second wireless device may be placed into a discoverable mode 412, such as a self-pairing mode, in which one wireless device (e.g., the first wireless device) may be designated a discovering wireless device and the other wireless device (e.g., the second wireless device) may be designated a discoverable wireless device. The self-pairing mode may be triggered in a variety of ways. For example, when the first and second wireless devices are powered on, if they are not already paired with another wireless device, each of the first and second wireless devices may be configured to enter the self-pairing mode. As another example, when the first and second wireless devices are placed in a charging wireless device, each of the first and second wireless devices may be configured to enter the self-pairing mode. As yet another example, the first and second wireless devices may be configured to enter the self-pairing mode when a dedicated button, or a button sequence, is pressed by a user on each wireless device. Once the first and second wireless device are in the self-pairing mode, no further user interaction may be needed for each wireless device to verify the other wireless device and for the wireless devices to perform a pairing operation with each other. In some embodiments, the first and second wireless devices may remain in the self-pairing mode for a predetermined period of time, after which if the wireless devices are not paired with each other each of the first and second wireless devices may exit the self-pairing mode, in order to prevent either the first or second wireless device from pairing with another wireless device. In some embodiments, when the second wireless device, which has been designated a discoverable wireless device, enters into the self-pairing mode, the second wireless device may remain discoverable (i.e., in the self-pairing mode) for a predetermined period of time (e.g., a discoverable period).

In some embodiments, the first and/or second wireless devices may provide additional security by limiting an amount of time during within which wireless devices must send and/or receive information and continue with the method 400, which may limit a distance within which wireless devices may authenticate each other. For example, when the first wireless device 102 sends the discovery query 302, the processor of the first wireless device may also start a timer set to expire after a timeout period (e.g., timeout 1). When the first wireless device does not receive an appropriate response to the discovery query (e.g., discovery response 304) before the expiration of the timeout 1 period, the first wireless device may ignore any further messages, and may also stop further operations of the method 400. As another example, when the second wireless device is placed into the discoverable state or mode, the second wireless device may also start a timer set to expire after a timeout period (e.g., timeout 2). When the second wireless device does not receive a discovery query (e.g., discovery query 302) before the expiration of the timeout 2 period, the second wireless device may ignore any further messages, and may also stop further operations of the method 400.

In response to the inquiry message, the second wireless device may send discovery response 304, which may be sent in response to the receipt by the second wireless device of the discovery query from the first wireless device. The discovery response may provide information to the first wireless device of the identity and/or certain capabilities of the second wireless device.

The first wireless device may authenticate the second wireless device based on the determined signal level and/or the discovery response 304 received by the first wireless device from the second wireless device.

In some embodiments, the first wireless device may select the second wireless device from among a plurality of responding wireless devices when the second wireless device's discovery response includes the highest signal strength. The first wireless device may also select the second wireless device when the second wireless device's discovery response includes the highest signal strength and a second wireless device local name that matches a local name value stored on the first wireless device. More complex filtering by the first wireless device is also possible. For example, the first wireless device may determine whether a second wireless device UUID is present in the second wireless device's discovery response, or whether the second wireless device Bluetooth address matches an expected Bluetooth address (that may be stored on the first wireless device, for example). When the first wireless device authenticates the second wireless device, the first wireless device may send the first capability query 312 to the second wireless device.

In response to the first capability query 312, the second wireless device may send to the first wireless device the first capability response 314. The first capability response may include information that informs the first wireless device about the capabilities of, and services available from, the second wireless device.

The first wireless device may also receive from the second wireless device the second service capability query 316. The first and second service capability queries may include an SDP query, as may be used in the Bluetooth communication protocol, or another similar query according to another communication protocol. In some embodiments, the second wireless device may send the second capability query in response to receiving the first discovery query from the first wireless device. In some embodiments, the second capability query may be sent by the second wireless device to the first wireless device before, after, and/or together with the first discovery response information.

In response to the second capability query, the first wireless device may send to the second wireless device the second capability response 318, which may include information about capabilities of, and services available from, the first wireless device. While each of the first capability query, the first capability response, the second capability query, and the second capability response is illustrated in FIG. 4 as a single line, in some embodiments each of the first capability query, the first capability response, the second capability query, and the second capability response may include two or more queries and corresponding responses. The multiple capability queries and responses may be described as capability gathering session.

Using the first capability response information, the first wireless device may authenticate 320 the second wireless device, and using the second capability response information, the second wireless device may authenticate 322 the first wireless device. In some embodiments, the first and second wireless devices may use the authentication 320 or 322 to determine whether to pair with the other wireless device.

In an embodiment, when a wireless device authenticates the other wireless device, the wireless device may place the other wireless device on a "white list" or otherwise store an indication that the first wireless device is authenticated for pairing by the second wireless device.

In some embodiments, the first and/or second wireless devices may provide additional security by limiting an amount of time within which each wireless device may send and/or receive capability information (e.g., the first and second capability queries and responses). For example, when the first wireless device 102 sends the first capability query 312, the processor of the first wireless device may also start a timer set to expire at the end of a timeout period (e.g., timeout 3). When the first wireless device does not receive an appropriate response to the discovery query (e.g., the first capability response 314) before expiration of the timeout 3 period, or when the first wireless device does not authenticate 320 the second wireless device before expiration of the timeout 3 period, or when the first and second wireless devices do not initiate a pairing process before expiration of the timeout 3 period, the first wireless device may ignore any further messages, and may also stop further operations of the method 400.

As another example, when the second wireless device 102 receives the first capability query 312, the processor of the second wireless device may also start a timer set to expire at the end of a timeout period (e.g., timeout 4). When the second wireless device does not receive an appropriate response to the second discovery query (e.g., the second capability response 318) before expiration of the timeout 4 period, or when the second wireless device does not authenticate 322 the first wireless device before expiration of the timeout 4 period, or when the first and second wireless devices do not initiate a pairing process before expiration of the timeout 4 period, the second wireless device may ignore any further messages, and may also stop further operations of the method 400.

After authenticating the second wireless device 320, the first wireless device may send a pairing request 402 to the second wireless device. For example, the first wireless device may send a request to the second wireless device to initiate a secure simple pairing process, such as Just Works Secure Simple Pairing. The second wireless device may optionally respond to the first wireless device with a pairing acceptance message 404. When the second wireless device has placed the first wireless device on a white list or otherwise indicated that the first wireless device is authenticated for pairing, the second wireless device may send the pairing acceptance message. In some embodiments, the second wireless device may send the pairing request to the first wireless device.

When the first and second wireless devices initiate the pairing process, each of the wireless devices may perform an initialization of a communication link between them. In some embodiments, each of the first and second wireless devices may perform an internal calculation 410a, 410b, in which each wireless device generates a cryptographic key, such as a link key, which may be used to cryptographically encode and decode communication between the first and second wireless devices. When the link key or cryptographic key generated on each of the first and second wireless devices match, communication 112 may be conducted between the first and second wireless devices. Typically, the cryptographic or link key is not transmitted between the first and second wireless device, but rather is used in a cryptographic algorithm at each of the first and second wireless devices to encrypt and decrypt communication. In some embodiments, after the first and second wireless devices perform the pairing process, they may be considered paired, "associated," or "bonded." In some embodiments, after successful pairing the first and second wireless devices may exit the self-pairing mode.

Figure 6:
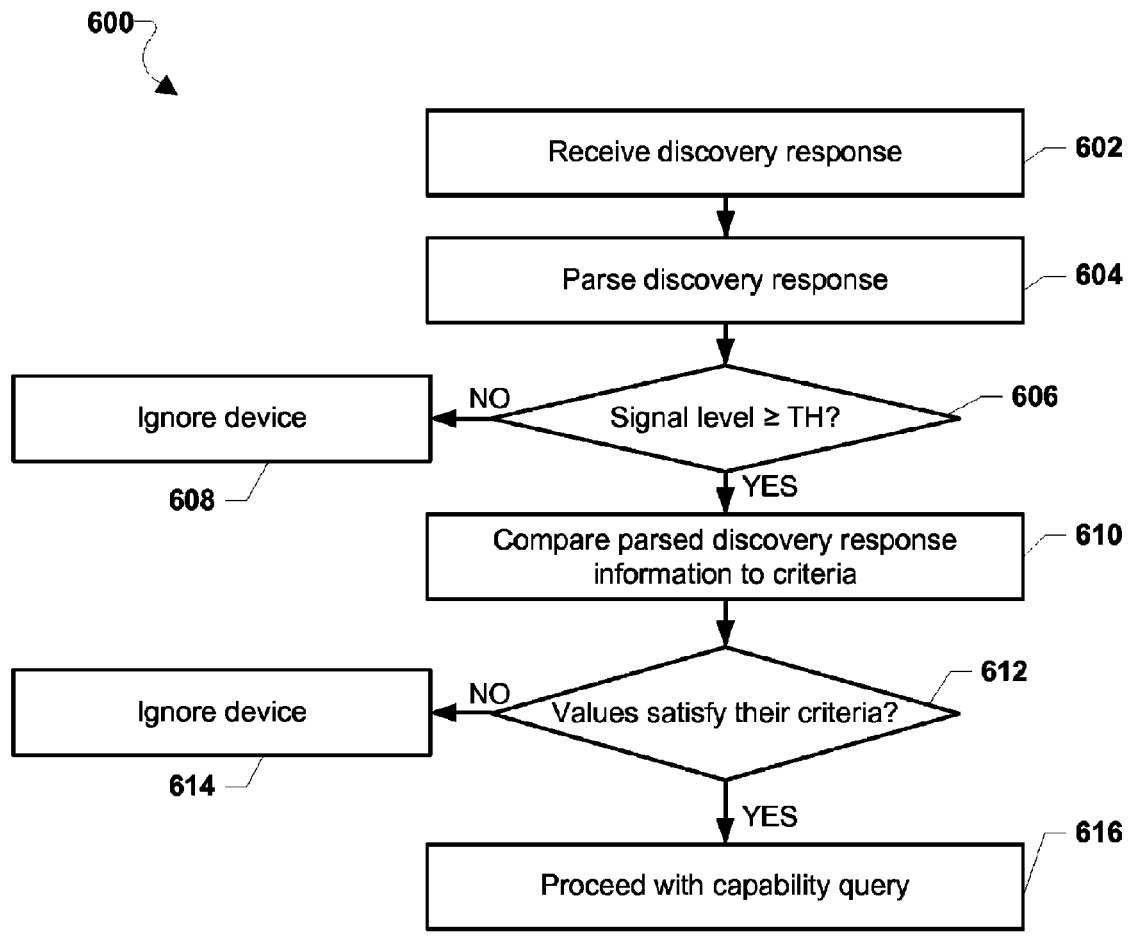
FIG. 6 is a process flow diagram illustrating an embodiment method for pairing wireless devices without user interaction or with reduced user interaction.

FIG. 6 is a process flow diagram illustrating an embodiment method 600 that may be implemented by a processor on a wireless device (e.g., the processor of the first wireless device 102 or of the second wireless device 104 of FIG. 1, and/or the like) for verifying another wireless device for pairing according to some embodiments. In block 602, the first wireless device may receive a discovery response from the second wireless device. The discovery response may be sent by the second wireless device in response to a discovery query sent from the first wireless device. The operations performed in block 602 may be similar to the operations in block 304 of the method 300 described above with reference to FIG. 3.

In block 604, the wireless device that received the discovery response information may parse the discovery response information. The first wireless device may determine a received signal level (e.g., a received signal strength indicator (RSSI)) based on the signal in which the first wireless device receives the discovery response. The discovery response may include information such as an address and/or an identifier of the second wireless device, a transmit power level of the second wireless device, an enumerator or description of capabilities of the second wireless device, and/or other similar link enabling information. In some embodiments, the discovery response may include an FHS packet and/or EIR information, as may be used in the Bluetooth protocol.

In determination block 606, the first wireless device may determine whether the received signal level meets or exceeds a signal level threshold (e.g., is greater than or equal to the signal level threshold). In response to determining that the received signal level does not meet the signal level threshold (i.e., determination block 606="NO"), the first wireless device may ignore the second wireless device in block 608.

In response to determining that the received signal level meets or exceeds the signal level threshold (i.e., determination block 606="YES"), the first wireless device may compare the parsed discovery response information to one or more criteria stored on the first wireless device in block 610. For example, when one or more of an address of the second wireless device, or an identifier of the second wireless device, and/or an enumerator or description of capabilities of the second wireless device substantially matches an expected value or values stored on the first wireless device, the first wireless device may proceed to discover capabilities of the second wireless device. In some embodiments, each element of the discovery response information must substantially match its respective criterion for the first wireless device to proceed. In some embodiments, as long as one of the elements of the discovery response information substantially matches its respective criterion, the first wireless device may proceed.

In response to determining that the values do not satisfy or match their respective criteria (i.e., determination block 612="NO"), the first wireless device may ignore the second wireless device in block 614. In response to determining that the values satisfy or match their respective criteria (i.e., determination block 612="YES"), the first wireless device may proceed with querying the capabilities of the second wireless device in block 616.

Figure 7:
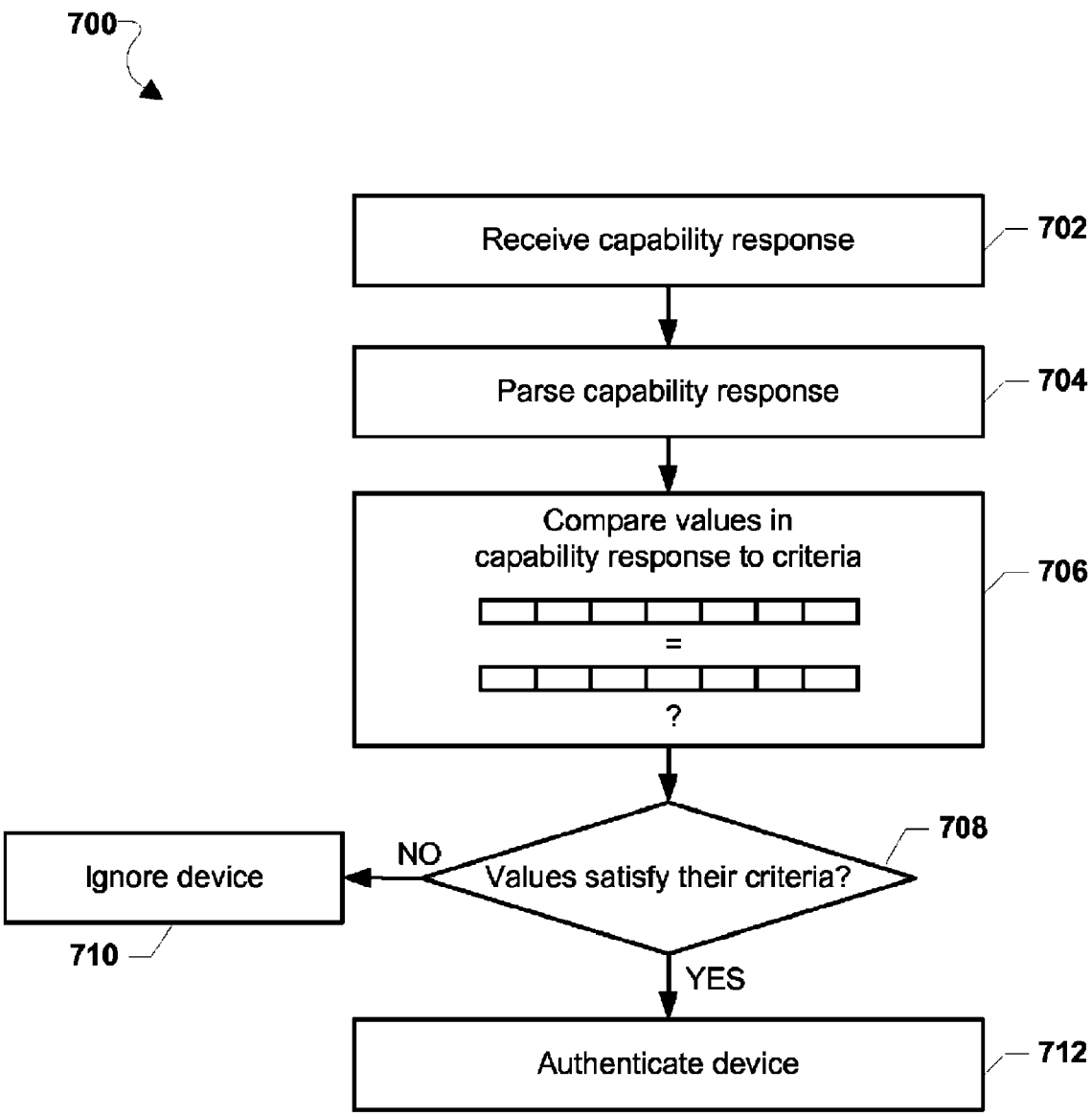
FIG. 7 is a process flow diagram illustrating another embodiment method for pairing wireless devices without user interaction or with reduced user interaction.

FIG. 7 illustrates a process flow diagram of an embodiment method 700 that may be implemented by a processor on a wireless device (e.g., the processor of the first wireless device 102 or of the second wireless device 104 of FIG. 1, and/or the like) for verifying another wireless device for pairing according to some embodiments. In block 702, the first wireless device or second wireless device may receive capability response information from the other wireless device. The operations performed in block 702 may be similar to, for example, block 314 and/or block 318 in FIG. 3. In block 704, the wireless device that received the capability response may parse the capability response to determine capability response information. The capability response information may include, for example, information similar to that illustrated in FIG. 5. For clarity, the description below will refer to the first wireless device receiving discovery response information from the second wireless device. However, the method 700 may be performed in the second wireless device that received discovery response information from the first wireless device.

In block 706, the first wireless device may compare the values of the capability response information to criteria stored on the first wireless device. In some embodiments, the first wireless device may compare a value based on all of the information in the capability response to a value stored on the first wireless device. For example, the first wireless device may use a numerical value of the entire capability response, or the first wireless device may calculate a value (e.g., a vector, a hash value, or another derived value) using the capability response information. In some embodiments, the first wireless device may calculate a weighted sum of the capability response and/or all of the capability response information. For example, a match of certain of the capability response information to its respective criterion may receive more weight, and thus may increase the weighted sum more than capability response information that is given less weight.

In determination block 708, the first wireless device may determine whether the calculated value satisfies a criterion. The criterion may include an exact match, or a substantially exact match, of the calculated value. When the first wireless device calculates a sum, or a weighted sum, in some embodiments the first wireless device may determine whether the sum meets or exceeds a threshold sum. In response to determining that the calculated value does not satisfy the criterion (i.e., determination block 708="NO"), the first wireless device may ignore further communication from, or may block pairing or further communication with, the sending wireless device in block 710. In some embodiments, the first wireless device may further determine that the wireless device that sent the discovery response information is not the second wireless device and/or that the sending wireless device is an attacking, third wireless device that is attempting to surreptitiously pair with the first wireless device (e.g., by performing a man-in-the-middle attack). In response to determining that the calculated values satisfy the criteria (i.e., determination block 708="YES"), the first wireless device may determine that the sending wireless device is authenticated for pairing in block 712.

Figure 8:
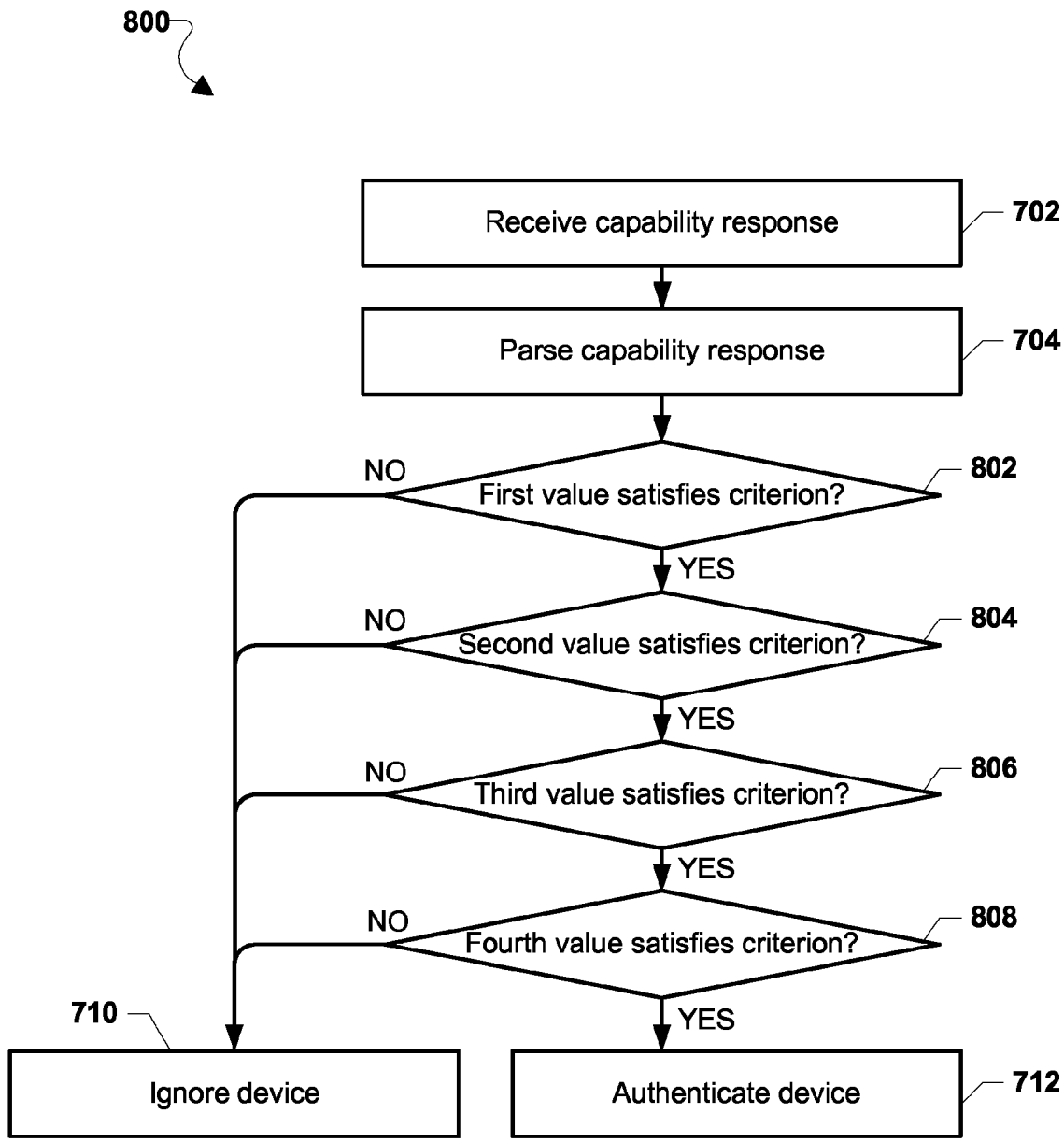
FIG. 8 is a process flow diagram illustrating another embodiment method for pairing wireless devices without user interaction or with reduced user interaction.

FIG. 8 illustrates an embodiment method 800 that may be implemented by a processor on a wireless device (e.g., the processor of the first wireless device 102 or of the second wireless device 104 of FIG. 1, and/or the like) for verifying another wireless device for pairing according to some embodiments. In block 702, the first wireless device or second wireless device may receive discovery response information from the other wireless device. The operations performed in block 702 may be similar to, for example, block 314 and/or block 318 in FIG. 3. In block 704, the wireless device that received the discovery response information may parse the discovery response information. The discovery response information may include, for example, information similar to that illustrated in FIG. 5. For clarity, the description below will refer to the first wireless device receiving discovery response information from the second wireless device. However, the method 800 may be performed in the second wireless device that received discovery response information from the first wireless device.

In determination blocks 802-808, the first wireless device may perform a set of comparisons in which the first wireless device may compare each of the parsed information to respective criteria. The criteria may depend on the type of parsed information to which it may be compared. As one example, the capability response 500 may include a SpecificationID (which may correspond with the first information 502), a VendorID (which may correspond with the second information 504), a ProductID (which may correspond with the third information 506), Bluetooth profiles available in the second wireless device (which may correspond with the fourth information 508), a Version (which may correspond with fifth information 510), a PrimaryRecord (which may correspond with sixth information 512), and a VendorID-Source (which may correspond with seventh information 514).

In determination block 802, the first wireless device may compare the SpecificationID value from the sending wireless device to a stored SpecificationID, or to a range of SpecificationIDs. In response to determining that the first value (e.g., the SpecificationID value) does not satisfy the first criterion (e.g., theSpecificationID or range of SpecificationIDs) (i.e., determination block 802="NO"), the first wireless device may ignore further communication from, or may block pairing or further communication with, the sending wireless device in block 710. When the first value satisfies the criterion (i.e., determination block 802="YES"), the first wireless device may compare a second value to its respective criterion in determination block 804. For example, the first wireless device may compare the VendorID of the sending wireless device to a specific VendorID or a range of permissible VendorIDs for pairing. When the second value (e.g., the VendorID) does not satisfy the second criterion (e.g., the VendorID or range of permissible VendorIDs for pairing) (i.e., determination block 804="NO"), the first wireless device may ignore further communication from, or may block pairing or further communication with, the sending wireless device in block 710.

When the second value satisfies the second criterion (i.e., determination block 804="YES"), the first wireless device may compare a third value to its respective criterion (i.e., determination block 806). For example, the first wireless device may compare the ProductID of the sending wireless device to a specific ProductID or a range of permissible ProductIDs. When the second value (e.g., the ProductID) does not satisfy the second criterion (e.g., the specific ProductID or range of permissible ProductIDs) (i.e., determination block 806="NO"), the first wireless device may ignore further communication from, or may block pairing or further communication with, the sending wireless device in block 710.

When the third value satisfies the third criterion (i.e., determination block 806="YES"), the first wireless device may compare a fourth value to its respective criterion in determination block 808. For example, the first wireless device may compare the Bluetooth profiles available in the sending wireless device to a set or range of acceptable Bluetooth profiles. When the fourth value (e.g., the Bluetooth profiles available in the sending wireless device) does not satisfy the fourth criterion (e.g., the set or range of acceptable Bluetooth profiles) (i.e., determination block 808="NO"), the first wireless device may ignore further communication from, or may block pairing or further communication with, the sending wireless device in block 710. When the fourth value satisfies the fourth criterion (i.e., determination block 808="YES"), the first wireless device may determine that the sending wireless device is authenticated for pairing in block 712.

Figure 9:
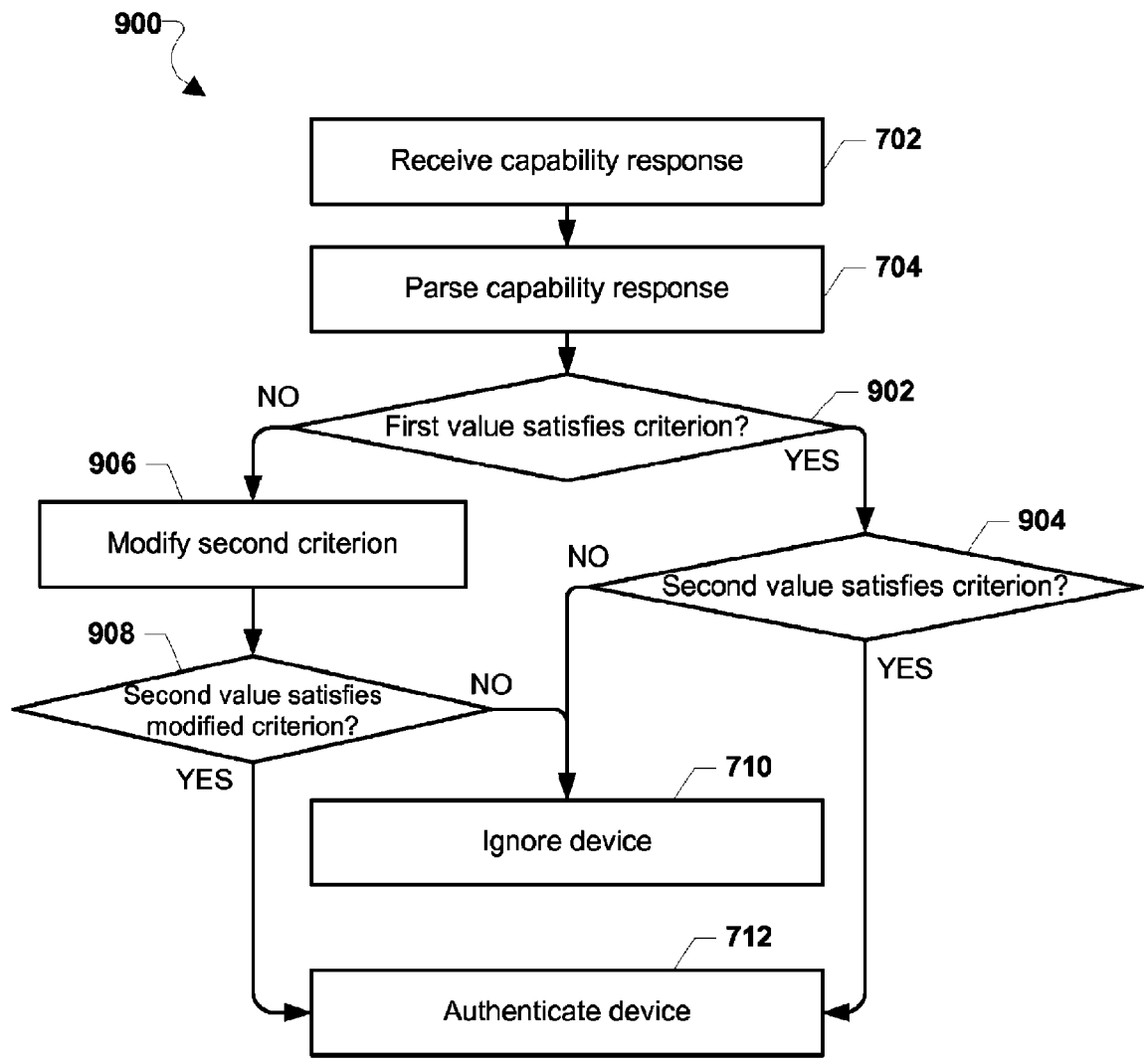
FIG. 9 a process flow diagram illustrating another embodiment method for pairing wireless devices without user interaction or with reduced user interaction.

FIG. 9 illustrates an embodiment method 900 that may be implemented by a processor on a wireless device (e.g., the processor of the first wireless device 102 or of the second wireless device 104 of FIG. 1, and/or the like) for verifying another wireless device for pairing according to some embodiments. In block 702, the first wireless device or second wireless device may receive a capability response from the other wireless device. The operations performed in block 702 may be similar to the operations in block 314 and/or block 318 described above with reference to FIG. 3. In block 704, the wireless device that received the capability response may parse the capability response to determine capability response information. The capability response information may include, for example, information similar to that illustrated in FIG. 5. For clarity, the description below will refer to the first wireless device receiving a capability response from the second wireless device. However, the method 900 may be performed in the second wireless device that received a capability response from the first wireless device.

In determination block 902, the first wireless device may compare a first value that is parsed from the capability response to a criterion. For example, the first wireless device may compare the first value from the sending wireless device (e.g., a SpecificationID) to a criterion (e.g., a specific SpecificationID or a range of permissible SpecificationIDs). When the first value satisfies the criterion (i.e., determination block 902="YES"), the first wireless device may compare a second value to its respective criterion in determination block 904. For example, the first wireless device may compare the SpecificationID of the sending wireless device to a range of permissible SpecificationIDs for pairing. When the second value (e.g., the SpecificationID of the sending wireless device) does not satisfy the second criterion (e.g., the range of permissible SpecificationIDs for pairing) (i.e., determination block 904="NO"), the first wireless device may ignore further communication from, or may block pairing or further communication with, the sending wireless device in block 710. When the second value satisfies the second criterion (i.e., determination block 904="YES"), the first wireless device may determine that the sending wireless device is authenticated for pairing in block 712.

In some embodiments, when the first value (e.g., the SpecificationID) does not satisfy the first criterion (e.g., the specific SpecificationID or range of SpecificationIDs) (i.e., determination block 902="NO"), the first wireless device may modify the second criterion to which the second parsed value may be compared in block 906. For example, when the second value is a VendorID of the sending wireless device, the first wireless device may require a closer or exact match of the second value to the second criterion. For example, the first wireless device may modify the second criterion from a range of permissible VendorIDs for pairing to a set of specific VendorIDs to which pairing may be permitted (i.e., a modified second criterion). By configuring the first wireless device to modify a second criterion when the first value does not satisfy the first criterion, the first wireless device may not require a match of all of the parsed values with all of the criteria to authenticate the sending wireless device (i.e., to verify that the sending wireless device is the second wireless device). By modifying the second criterion when the first value fails to satisfy the first criterion, the second criterion may be adjusted to require a higher level of specificity or confidence when compared to the second parsed value, and may still enable the first wireless device to verify or authenticate the second wireless device despite one or more parsed values not matching their respective criteria. Modification of criteria may be performed selectively, depending on the respective parsed value. Some values may not be modified because of their security importance. For example, an RSSI threshold may not be lowered beyond a certain level to ensure a minimum level of proximity between the first and second wireless devices. As another example, a static portion of a machine address (e.g., a Bluetooth device address) may not be modified at all, since the static portion may indicate an acceptable manufacturer value. Other examples are also possible.

The first wireless device may compare the second value to the modified second criterion in determination block 908. When the second value (e.g., the VendorID of the sending wireless device) does not satisfy the modified second criterion (e.g., the set of specific VendorIDs to which pairing may be permitted) (i.e., determination block 908="NO"), the first wireless device may ignore further communication from, or may block pairing or further communication with, the sending wireless device in block 710. When the second value satisfies the modified second criterion (i.e., determination block 908="YES"), the first wireless device may determine that the sending wireless device is authenticated for pairing in block 712.

Figure 10:
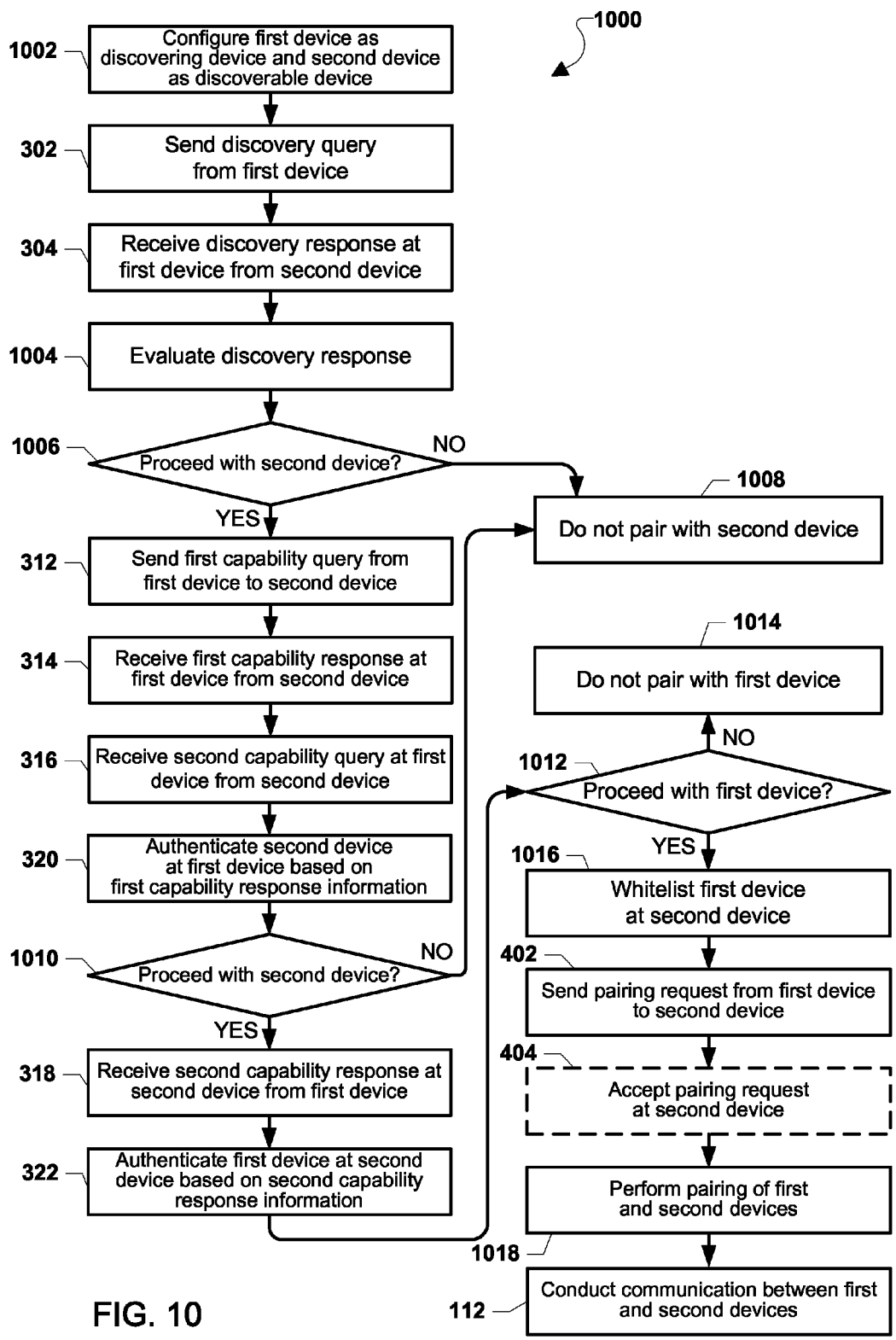
FIG. 10 is a component block diagram of a mobile wireless device suitable for use in various embodiments.

FIG. 10 illustrates a process flow diagram of an embodiment method 1000 that may be implemented by a processor on a wireless device (e.g., the processor of the first wireless device 102 or of the second wireless device 104 of FIG. 1, and/or the like) for verifying another wireless device for pairing according to some embodiments. In block 1002, the first wireless device and the second wireless device may be placed into a self-pairing mode, in which the first wireless device may be designated a discovering wireless device and the second wireless device may be designated a discoverable wireless device. The self-pairing mode may be triggered in a variety of ways. For example, when the first and second wireless devices are powered on, if they are not already paired with another wireless device, each of the first and second wireless devices may be configured to enter the self-pairing mode. As another example, when the first and second wireless devices are placed in a charging wireless device, each of the first and second wireless devices may be configured to enter the self-pairing mode. As yet another example, the first and second wireless devices may be configured to enter the self-pairing mode when a dedicated button, or a button sequence, is pressed by a user on each wireless device. Once the first and second wireless device are in the self-pairing mode, no further user interaction may be needed for each wireless device to verify the other wireless device and to perform a pairing operation with each other. In some embodiments, the first and second wireless devices may remain in the self-pairing mode for a predetermined period of time, after which if the wireless devices are not paired with each other each of the first and second wireless devices may exit the self-pairing mode, in order to prevent either the first or second wireless device from pairing with another wireless device. In some embodiments, when the second wireless device, which has been designated a discoverable wireless device, enters into the self-pairing mode, the second wireless device may remain discoverable (i.e., in the self-pairing mode) for a predetermined period of time (e.g., a discoverable period).

In block 302, the first wireless device 102 may send to the second wireless device 104 a discovery query. The discovery query may include a message broadcast by the first wireless device to determine whether any discoverable wireless devices are within reception range of the first wireless device (e.g., a Bluetooth inquiry message). In some embodiments, discovery query may include instructions or a request that the second wireless device provide information about its identity and/or certain of its capabilities. In response to the discovery query, the second wireless device may send a discovery response 304, which may be sent in response to the receipt by the second wireless device of the discovery query from the first wireless device.

In block 1004, the first wireless device may evaluate the discovery response. The first wireless device may determine a received signal power level based on the signal in which the first wireless device receives the discovery response. The discovery response may include information such as an address and/or an identifier of the second wireless device, a transmit power level of the second wireless device, an enumerator or description of capabilities of the second wireless device, and/or other similar information. In some embodiments, the discovery response may include a Frequency Hopping Synchronization (FHS) packet, as may be used in the Bluetooth protocol, which may include a device address (e.g., a Bluetooth device address) and/or clock data of the second wireless device. In some embodiments, the discovery response may include an Extended Inquiry Response (EIR), as may be used in the Bluetooth protocol, which may include one or more of service UUIDs, a name, configuration flags, custom manufacturer's data, and a transmit power level of the second wireless device. In some embodiments, the first wireless device may use the information in the discovery response to determine whether to send a capability query to the second wireless device. For example, the first wireless device may determine whether the received signal level satisfies a threshold signal power level. As another example, the first wireless device may compare some or all of the information in the discovery response to information stored on the first wireless device, and based on the comparison may determine whether to proceed with a capability determination of the second wireless device. In some embodiments, the first wireless device may filter a plurality of discovery responses that the first wireless device may receive from multiple other wireless devices using information in the various respective discovery responses.

Based on the evaluation of the discovery response, the first wireless device may determine whether to proceed with a self-pairing process with the second wireless device in determination block 1006. In response to determining not to proceed with the second wireless device (i.e., determination block 1006="NO"), the first wireless device may not pair with the second wireless device, which may include ignoring further communication from and/or blocking pairing or further communication with the second wireless device in block 1008.

In response to determining to proceed with the second wireless device (i.e., determination block 1006="YES"), the first wireless device may send to the second wireless device a first capability query in block 312. The capability query may include a service discovery protocol (SDP) query as may be used in the Bluetooth communication protocol or another similar query according to another communication protocol. The capability query may include instructions or a request that the second wireless device provide information about capabilities of, and services available from, the second wireless device.

In block 314, the first wireless device may receive from the second wireless device a first capability response. In block 316, the first wireless device may receive from the second wireless device a second capability query. In block 320, the first wireless device may authenticate the second wireless device based on the first capability response received by the first wireless device from the second wireless device. As illustrated in FIG. 10, in some embodiments, the operations of block 318 may be performed after the operations of block 320. In some embodiments, the capability query from the second wireless device may include an SDP query as may be used in the Bluetooth communication protocol or another similar query according to another communication protocol. In some embodiments, the second wireless device may send the second SDP query in response to receiving in the second wireless device the first discovery query. In some embodiments, the second SDP query may be sent by the second wireless device to the first wireless device before, after, and/or together with the first discovery response information.

Based on the authentication of the second wireless device, the first wireless device may determine whether to proceed with the second wireless device in determination block 1010. In response to the first wireless device determining not to proceed with the second wireless device (i.e., determination block 1010="NO"), the first wireless device may not pair with the second wireless device, which may include ignoring further communication from and/or blocking pairing or further communication with the second wireless device in block 1008.

In response to the first wireless device determining to proceed with the second wireless device (i.e., determination block 1010="YES"), the first wireless device may send to the second wireless device the second capability response in block 318. The second capability response may include information that informs the second wireless device about the capabilities of, and services available from, the first wireless device.

In block 322, the second wireless device may authenticate the first wireless device based on the second capability response information received by the second wireless device from the first wireless device. Based on the authentication of the first wireless device, the second wireless device may determine whether to proceed with the second wireless device in determination block 1012. In response to the second wireless device determining not to proceed with the first wireless device (i.e., determination block 1012="NO"), the second wireless device may not pair with the first wireless device, which may include ignoring further communication from and/or blocking pairing or further communication with the first wireless device in block 1014.

In response to the second wireless device determining to proceed with the first wireless device (i.e., determination block 1012="YES"), the second wireless device may place the first wireless device on a "white list" or otherwise store an indication that the first wireless device is authenticated for pairing by the second wireless device in block 1016. In some embodiments, alternatively or additionally, the first wireless device may place the second wireless device on a white list for pairing.

In block 402, first wireless device may send a pairing request to the second wireless device. For example, the first wireless device may send a request to the second wireless device to initiate a secure simple pairing process, such as Just Works Secure Simple Pairing. The second wireless device may optionally respond to the first wireless device with a pairing acceptance message 404. When the second wireless device has placed the first wireless device on a white list or otherwise indicated that the first wireless device is authenticated for pairing, the second wireless device may send the pairing acceptance message. When the first and second wireless devices initiate the pairing process in block 1018, each of the wireless devices may perform an initialization of a communication link between them. In some embodiments, each of the first and second wireless devices may perform an internal calculation in which each wireless device generates a cryptographic key, such as a link key, which may be used to cryptographically encode and decode communication between the first and second wireless devices. When the link key or cryptographic key generated on each of the first and second wireless devices match, communication 112 may be conducted between the first and second wireless devices. In some embodiments, after successful pairing the first and second wireless devices may exit the self-pairing mode.

Figure 11:
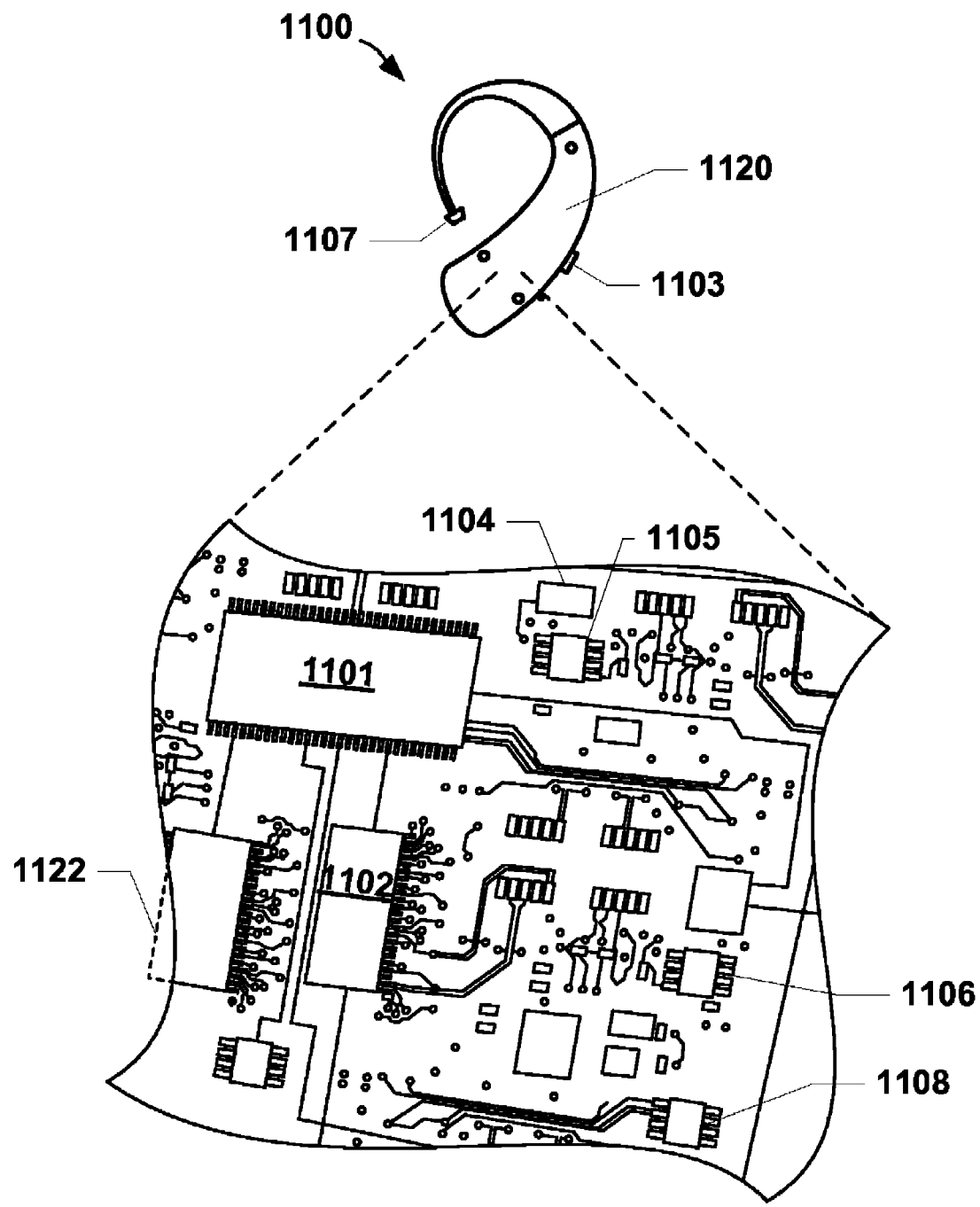
FIG. 11 is a component block diagram of another mobile wireless device suitable for use in various embodiments.
Figure 12:
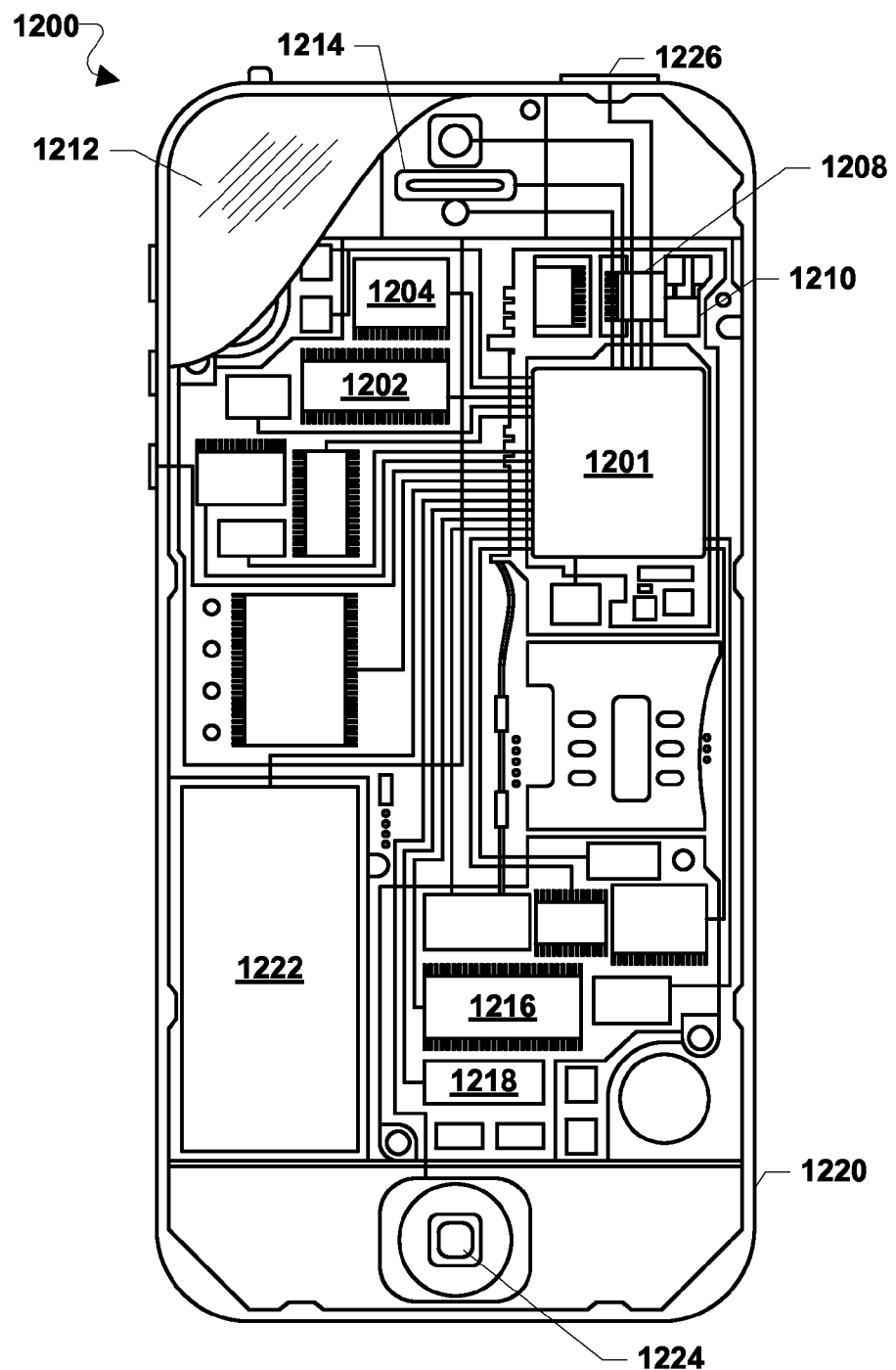
FIG. 12 is a component block diagram of another mobile wireless device suitable for use in various embodiments.
Figure 13:
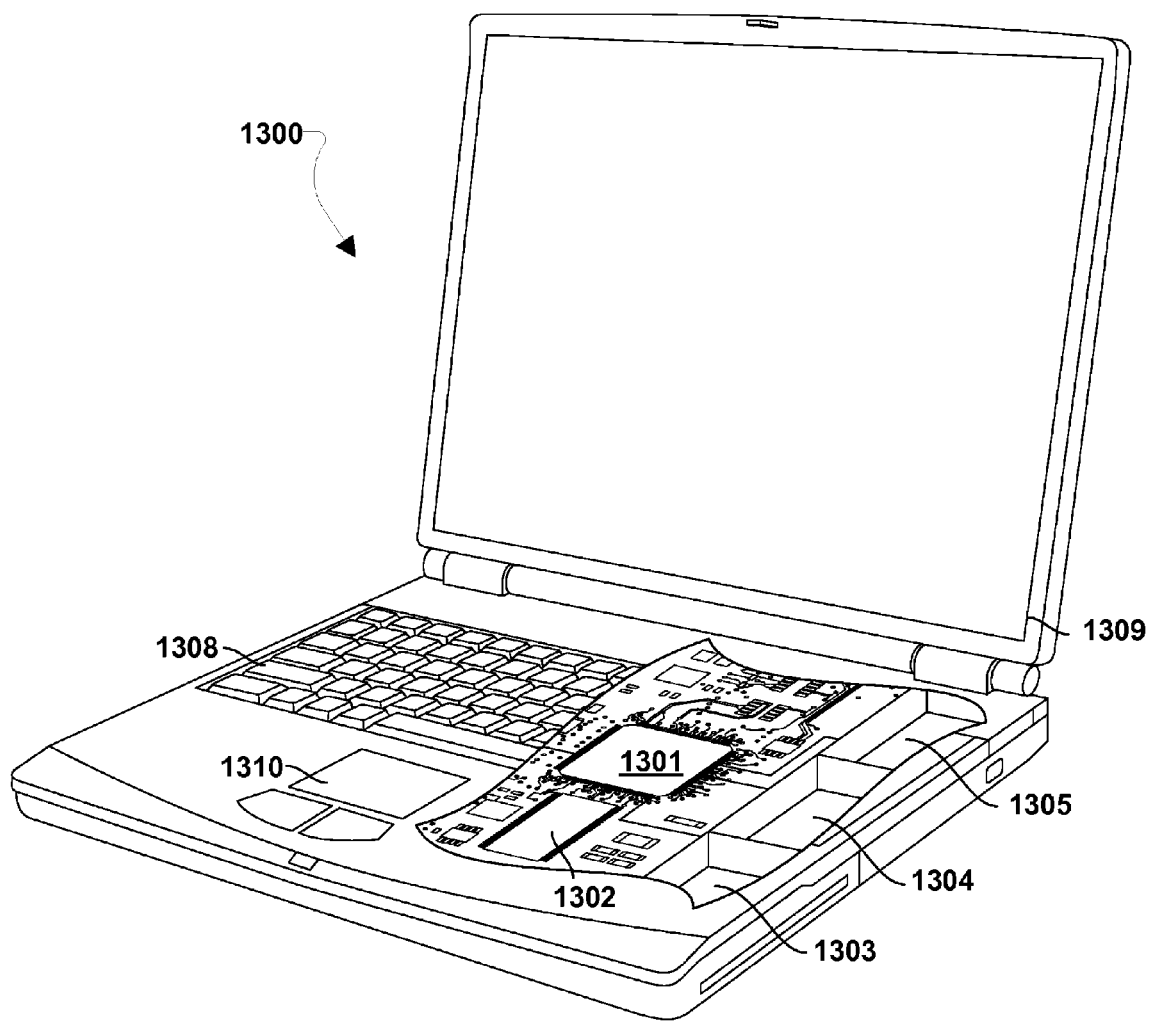
FIG. 13 is a component block diagram of another mobile wireless device suitable for use in various embodiments.

Various embodiments may be implemented in any of a variety of mobile communication wireless devices, examples of which (e.g., an earpiece 1100, a mobile communication wireless device 1200, and a laptop computer 1300) are illustrated in FIGS. 11-13. In various embodiments, the earpiece 1100, the mobile communication wireless device 1200, and the laptop computer 1300 may be similar to the first and second wireless devices 102, 104 as described with reference to FIG. 1. As such, the earpiece 1100, the mobile communication wireless device 1200, and the laptop computer 1300 may implement the methods 300, 400, 600, 700, 800, 900, and 1000 of FIG. 310.

The earpiece 1100 may include a processor 1101 coupled to internal memory 1102. The earpiece 1100 may include an antenna 1104 for sending and receiving electromagnetic radiation that may be connected to a wireless data link transceiver 1105 coupled to the processor 1101. The transceiver 1105 may include a Bluetooth transceiver 1108 for low-power short-range communications between wireless devices, or other similar communication circuitry (e.g., circuitry implementing the ZigBee (i.e., an IEEE 802.15.4) or WiFi protocols, etc.). The earpiece 1100 may include a sound encoding/decoding (CODEC) circuit 1106 that digitizes sound received from a microphone into data packets suitable for wireless transmission and decodes received sound data packets to generate analog signals that are provided to a speaker 1107 for providing audio outputs. Also, one or more of the processor 1101, wireless transceiver 1105 and CODEC 1106 may include a digital signal processor (DSP) circuit (not shown separately).

The earpiece 1100 may also include a housing 1120, constructed of a plastic, metal, or a combination of materials, for containing all or some of the components discussed herein. The earpiece 1100 may include a power source 1122 coupled to the processor 1101, such as a disposable or rechargeable battery. The rechargeable battery may also be coupled to a peripheral wireless device connection port to receive a charging current from a source external to the earpiece 1100. The earpiece 1100 may also include a physical button 1103 for receiving user inputs and/or for turning the earpiece 1100 on and off. The earpiece 1100 may also include one or more light-emitting diodes (LEDs) or other similar emitters to provide indications of power status and the like.

FIG. 12 is a component block diagram of a mobile communication wireless device 1200 suitable for implementing various embodiments. The mobile communication wireless device 1200 may include a processor 1201 coupled to a touchscreen controller 1204 and an internal memory 1202. The processor 1201 may be one or more multi-core integrated circuits designated for general or specific processing tasks. The internal memory 1202 may be volatile or nonvolatile memory, and may also be secure and/or encrypted memory, or unsecure and/or unencrypted memory, or any combination thereof. The touchscreen controller 1204 and the processor 1201 may also be coupled to a touchscreen panel 1212, such as a resistive-sensing touchscreen, capacitive-sensing touchscreen, infrared sensing touchscreen, etc. Additionally, the display of the mobile communication wireless device 1200 need not have touch screen capability.

The mobile communication wireless device 1200 may have two or more radio signal transceivers 1208 (e.g., Peanut, Bluetooth, Zigbee, Wi-Fi, RF radio) and antennae 1210, for sending and receiving communications, coupled to each other and/or to the processor 1201. The transceivers 1208 and antennae 1210 may be used with the above-mentioned circuitry to implement the various wireless transmission protocol stacks and interfaces. The mobile communication wireless device 1200 may include one or more cellular network wireless modem chip(s) 1216 coupled to the processor and antennae 1210 that enables communication via two or more cellular networks via two or more radio access technologies.

The mobile communication wireless device 1200 may include a peripheral wireless device connection interface 1218 coupled to the processor 1201. The peripheral wireless device connection interface 1218 may be singularly configured to accept one type of connection, or may be configured to accept various types of physical and communication connections, common or proprietary, such as USB, FireWire, Thunderbolt, or PCIe. The peripheral wireless device connection interface 1218 may also be coupled to a similarly configured peripheral wireless device connection port (not shown).

The mobile communication wireless device 1200 may also include speakers 1214 for providing audio outputs. The mobile communication wireless device 1200 may also include a housing 1220, constructed of a plastic, metal, or a combination of materials, for containing all or some of the components discussed herein. The mobile communication wireless device 1200 may include a power source 1222 coupled to the processor 1201, such as a disposable or rechargeable battery. The rechargeable battery may also be coupled to the peripheral wireless device connection port to receive a charging current from a source external to the mobile communication wireless device 1200. The mobile communication wireless device 1200 may also include a physical button 1224 for receiving user inputs. The mobile communication wireless device 1200 may also include a power button 1226 for turning the mobile communication wireless device 1200 on and off.

FIG. 13 is a component block diagram of a laptop computer 1300 suitable for implementing various embodiments. The personal computer 1300 generally may include a processor 1301 coupled to volatile memory 1302 and a large capacity nonvolatile memory, such as a disk drive 1303. The computer 1300 may also include a compact disc (CD) and/or DVD drive 1304 coupled to the processor 1301. The laptop computer 1300 may also include a number of connector ports coupled to the processor 1301 for establishing data connections or receiving external memory wireless devices, such as a network connection circuit 1305 for coupling the processor 1301 to a network. The laptop computer 1300 may further be coupled to a keyboard 1308, a pointing wireless device such as a mouse or trackpad 1310, and a display 1309.

The processors 1101, 1201, and 1301 may be any programmable microprocessor, microcomputer or multiple processor chip or chips that can be configured by software instructions (applications) to perform a variety of functions, including the functions of various embodiments described below. In some mobile wireless devices, multiple processors 1101, 1201 and 1301 may be provided, such as one processor dedicated to wireless communication functions and one processor dedicated to running other applications. Typically, software applications may be stored in the internal memory 1102, 1202, and 1302 before they are accessed and loaded into the processor 1101, 1201, and 1301. The processor 1101, 1201, and 1301 may include internal memory sufficient to store the application software instructions.

The foregoing method descriptions, process flow diagrams, and call flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic wireless device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication wireless devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage wireless devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of verifying wireless devices for pairing, comprising:
  sending, from a first wireless device to a second wireless device, a discovery query;
  receiving, from the second wireless device in the first wireless device, a discovery response;
  authenticating, in the first wireless device, the second wireless device based on the discovery response;
  sending a first capability query from the first wireless device to the second wireless device in response to authenticating, in the first wireless device, the second wireless device based on the discovery response;
  receiving, in the first wireless device from the second wireless device, a first capability response including first capability response information;
  receiving, from the second wireless device in the first wireless device, a second capability query responsive to the first capability query;
  sending, from the first wireless device to the second wireless device, a second capability response including second capability response information responsive to the second capability query;
  authenticating, in the first wireless device, the second wireless device based on the first capability response information; and
  initiating a pairing process between the first and second wireless devices when the first wireless device authenticates the second wireless device.

2. The method of claim 1, wherein authenticating, in the first wireless device, the second wireless device is based on a set of one or more comparisons of the first capability response information and information stored on the first wireless device.

3. The method of claim 1, wherein authenticating, in the first wireless device, the second wireless device is based on a comparison of the first capability response information and information stored on the first wireless device and comprises:
  parsing values from the first capability response; and
  comparing each parsed value to a respective criterion.

4. The method of claim 1, wherein authenticating, in the first wireless device, the second wireless device is based on a comparison of the first capability response information and information stored on the first wireless device and comprises:
parsing a first value and a second value from the first capability response;
comparing the first value to a first criterion;
modifying a second criterion based on the comparison of the first value to the first criterion; and
comparing the second value to the modified second criterion.

5. The method of claim 1, further comprising:
sending, from the first wireless device to the second wireless device, a pairing request when the first wireless device authenticates the second wireless device based on the first capability response information; and
receiving, from the second wireless device in the first wireless device, an acceptance in response to the pairing request, wherein the acceptance is based on the second capability response information.

6. The method of claim 5, wherein the first capability response information comprises one or more of information about capabilities of and services available from the second wireless device, and the second capability response information comprises one or more of information about capabilities of and services available from the first wireless device.

7. The method of claim 1, wherein sending, from a first wireless device to a second wireless device, a first capability query comprises sending the first capability query based on the authentication of the second wireless device in the first wireless device based on the discovery response.

8. The method of claim 7, wherein the discovery response comprises one or more of a second wireless device identifier, a second wireless device address, a received signal level indicator related to the discovery query from the first wireless device, and a transmit power level of the second wireless device.

9. The method of claim 1, wherein the first wireless device is configured as a discovering wireless device and the second wireless device is configured as a discoverable wireless device.

10. The method of claim 1, wherein at least one of the first wireless device and the second wireless device comprises a mobile communication wireless device.

11. A wireless device, comprising:
a processor configured with processor-executable instructions to perform operations comprising:
sending, to a second wireless device, a discovery query;
receiving, from the second wireless device, a discovery response;
authenticating the second wireless device based on the discovery response;
sending a first capability query to the second wireless device in response to authenticating the second wireless device based on the discovery response;
receiving, from the second wireless device, a first capability response including first capability response information;
receiving, from the second wireless device, a second capability query responsive to the first capability query;
sending, to the second wireless device, a second capability response including second capability information responsive to the second capability query;
authenticating the second wireless device based on the first capability response information; and
initiating a pairing process between the wireless device and the second wireless device when the wireless device authenticates the second wireless device.

12. The wireless device of claim 11, wherein the processor is configured with processor-executable instructions to perform operations such that authenticating the second wireless device is based on a set of one or more comparisons of the first capability response information and information stored on the first wireless device.

13. The wireless device of claim 11, wherein the processor is configured with processor-executable instructions to perform operations such that authenticating the second wireless device is based on a comparison of the first capability response information and information stored on the first wireless device and comprises:
parsing values from the first capability response; and
comparing each parsed value to a respective criterion.

14. The wireless device of claim 11, wherein the processor is configured with processor-executable instructions to perform operations such that authenticating the second wireless device is based on a comparison of the first capability response information and information stored on the first wireless device and comprises:
parsing a first value and a second value from the first capability response;
comparing the first value to a first criterion;
modifying a second criterion based on the comparison of the first value to the first criterion; and
comparing the second value to the modified second criterion.

15. The wireless device of claim 11, wherein the first capability response information comprises one or more of information about capabilities of and services available from the second wireless device, and the second capability response information comprises one or more of information about capabilities of and services available from the first wireless device.

16. The wireless device of claim 11, wherein the processor is configured with processor-executable instructions to perform operations such that sending, to a second wireless device, a first capability query comprises sending the first capability query based on the authentication of the second wireless device in the wireless device based on the discovery response.

17. The wireless device of claim 16, wherein the discovery response comprises one or more of a second wireless device identifier, a second wireless device address, a received signal level indicator related to the discovery query from the wireless device, and a transmit power level of the second wireless device.

18. The wireless device of claim 11, wherein the wireless device is configured as a discovering wireless device and the second wireless device is configured as a discoverable wireless device.

* * * * *